US007872624B2

(12) United States Patent
Igarashi et al.

(10) Patent No.: US 7,872,624 B2
(45) Date of Patent: Jan. 18, 2011

(54) LIQUID CRYSTAL DISPLAY DEVICE

(75) Inventors: Kazuaki Igarashi, Hakusan (JP); Kenji Nakao, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 1119 days.

(21) Appl. No.: 11/505,898

(22) Filed: Aug. 18, 2006

(65) Prior Publication Data

US 2006/0274011 A1 Dec. 7, 2006

Related U.S. Application Data

(63) Continuation of application No. PCT/JP2005/002652, filed on Feb. 18, 2005.

(30) Foreign Application Priority Data

Feb. 20, 2004 (JP) ............................ 2004-045207

(51) Int. Cl.

*G09G 3/36* (2006.01)
*G09G 5/00* (2006.01)
*G06F 3/038* (2006.01)
*G02F 1/133* (2006.01)

(52) U.S. Cl. ........................... 345/87; 345/204; 349/33

(58) Field of Classification Search ......... 345/204–206, 345/690–693, 208–210, 87–89, 94–96, 101; 349/33, 75, 76, 120, 123

See application file for complete search history.

(56) References Cited

U.S. PATENT DOCUMENTS 6,671,009 B1 12/2003 Hattori et al.
6,862,015 B2 * 3/2005 Fujioka et al. ................ 345/98
7,483,007 B2 * 1/2009 Chen et al. .................... 345/87
2003/0001809 A1 1/2003 Hattori et al.
2003/0164813 A1 * 9/2003 Fujii .......................... 345/101
2006/0012590 A1 * 1/2006 Takeoka ..................... 345/204

FOREIGN PATENT DOCUMENTS

JP 9-185032 A 7/1997
JP 2001-83552 3/2001
JP 2002-98939 4/2002
JP 2002-214611 7/2002
JP 2003-121881 4/2003
JP 2003-185993 7/2003

OTHER PUBLICATIONS

U.S. Appl. No. 11/505,885, filed Aug. 18, 2006, Nakao, et al.
U.S. Appl. No. 11/505,890, filed Aug. 18, 2006, Nakao.

* cited by examiner

*Primary Examiner*—Alexander S. Beck
(74) *Attorney, Agent, or Firm*—Oblon, Spivak, McClelland, Maier & Neustadt, L.L.P.

(57) ABSTRACT

A liquid crystal display device includes a liquid crystal display element section that is initialized such that the alignment state of liquid crystal molecules is transitioned from a splay alignment to a bend alignment capable of displaying an image, and a driving circuit that applies, in the initialization, a transition voltage, which causes the alignment state of the liquid crystal molecules to be transitioned from the splay alignment to the bend alignment, to the liquid crystal display element section. In particular, the driving circuit includes a transition voltage setting unit that alternately sets the transition voltage at a first polarity and a second polarity that is opposite to the first polarity.

5 Claims, 32 Drawing Sheets

LIQUID CRYSTAL DISPLAY DEVICE

CROSS-REFERENCE TO RELATED APPLICATIONS

This is a Continuation Application of PCT Application No. PCT/JP2005/002652, filed Feb. 18, 2005, which was published under PCT Article 21(2) in Japanese.

This application is based upon and claims the benefit of priority from prior Japanese Patent Application No. 2004-045207, filed Feb. 20, 2004, the entire contents of which are incorporated herein by reference.

BACKGROUND OF THE INVENTION

1. Field of the Invention

The present invention relates to a liquid crystal display device that uses OCB (Optically Compensated Bend) liquid crystal display elements in order to display an image.

2. Description of the Related Art

The liquid crystal display device includes a liquid crystal display panel that provides a matrix array of OCB liquid crystal display elements. The liquid crystal display panel includes an array substrate in which a plurality of pixel electrodes are covered with an alignment film and arrayed in a matrix, a counter-substrate in which a counter-electrode is covered with an alignment film and disposed so as to face the pixel electrodes, and a liquid crystal layer that is held between the array substrate and the counter-substrate in contact with each of the alignment films. Further, the liquid crystal display panel is configured such that a pair of polarizers are attached to the array substrate and the counter-substrate via optical retardation plates (see Jpn. Pat. Appln. KOKAI Publication No. 9-185032, for instance). Each of the OCB liquid crystal display elements constitutes a pixel in a range of the associated pixel electrode. In the OCB liquid crystal display element, the alignment state of liquid crystal molecules needs to be transitioned from a splay alignment to a bend alignment capable of displaying an image, with the application of a transition voltage that is different from a normal driving voltage.

FIG. 35 shows an example of the structure of a conventional liquid crystal display device 90. In the liquid crystal display device 90, a power supply circuit 34, a controller 37, a source driver 38, a gate driver 39, a counter-electrode driver 40 and a transition voltage setting unit 97 are further provided in order to drive a matrix array of OCB liquid crystal display elements provided on a liquid crystal display (LCD) panel 41.

FIG. 36 illustrates the operation of the liquid crystal display device 90. If the power supply circuit 34 is turned on, the transition voltage setting unit 97 sets, during a transition period 5, a transition voltage 92 for causing the alignment state of liquid crystal molecules to be transitioned from the splay alignment to the bend alignment. The controller 37 controls the source driver 38, gate driver 39 and counter-electrode driver 40 such that the transition voltage 92 is applied to the OCB liquid crystal display elements. The transition voltage 92 is a DC voltage having a positive or negative polarity. In a display period 8 that follows the transition period 5, the controller 37 controls the source driver 38, gate driver 39 and counter-electrode driver 40 such that the OCB liquid crystal display elements display an image corresponding to a display signal that is in sync with a sync signal.

In the above-described structure, however, the transition voltage 92 is applied to the OCB liquid crystal display elements as DC voltage in the transition period 5 immediately after supply of power. If the application of the transition voltage is repeated each time the power is supplied, there arises a problem that liquid crystal molecules gradually become unable to be aligned in a state of the bend alignment completely transitioned from the splay alignment.

Further, with the use of DC voltage as the transition voltage, a reference voltage value for AC application would shift when the OCB liquid crystal display elements are AC driven in the display period 8 that follows the transition period 5. Consequently, the image display quality deteriorates due to flicker.

BRIEF SUMMARY OF THE INVENTION

An object of the present invention is to solve the above-described problems by providing a liquid crystal display device that is capable of improving image display quality.

According to the present invention, there is provided a liquid crystal display device comprising: a liquid crystal display element section that is initialized such that the alignment state of liquid crystal molecules is transitioned from a splay alignment to a bend alignment capable of displaying an image; and a driving circuit that applies, in the initialization, a transition voltage for causing the alignment state of the liquid crystal molecules to be transitioned from the splay alignment to the bend alignment, to the liquid crystal display element section, wherein the driving circuit includes a transition voltage setting unit that alternately sets the transition voltage at a first polarity and a second polarity opposite to the first polarity.

In this liquid crystal display device, the transition voltage is alternately set at the first polarity and second polarity, and applied to the liquid crystal display element section. With the application of the transition voltage, it is possible to prevent non-uniform distribution of liquid crystal molecules, which occurs in the initialization for transitioning the alignment state of liquid crystal molecules from the splay alignment to the bend alignment, and to enhance the display quality of images.

DETAILED DESCRIPTION OF THE INVENTION

A first embodiment of the present invention will now be described with reference to the accompanying drawings.

First Embodiment

Figure 1:
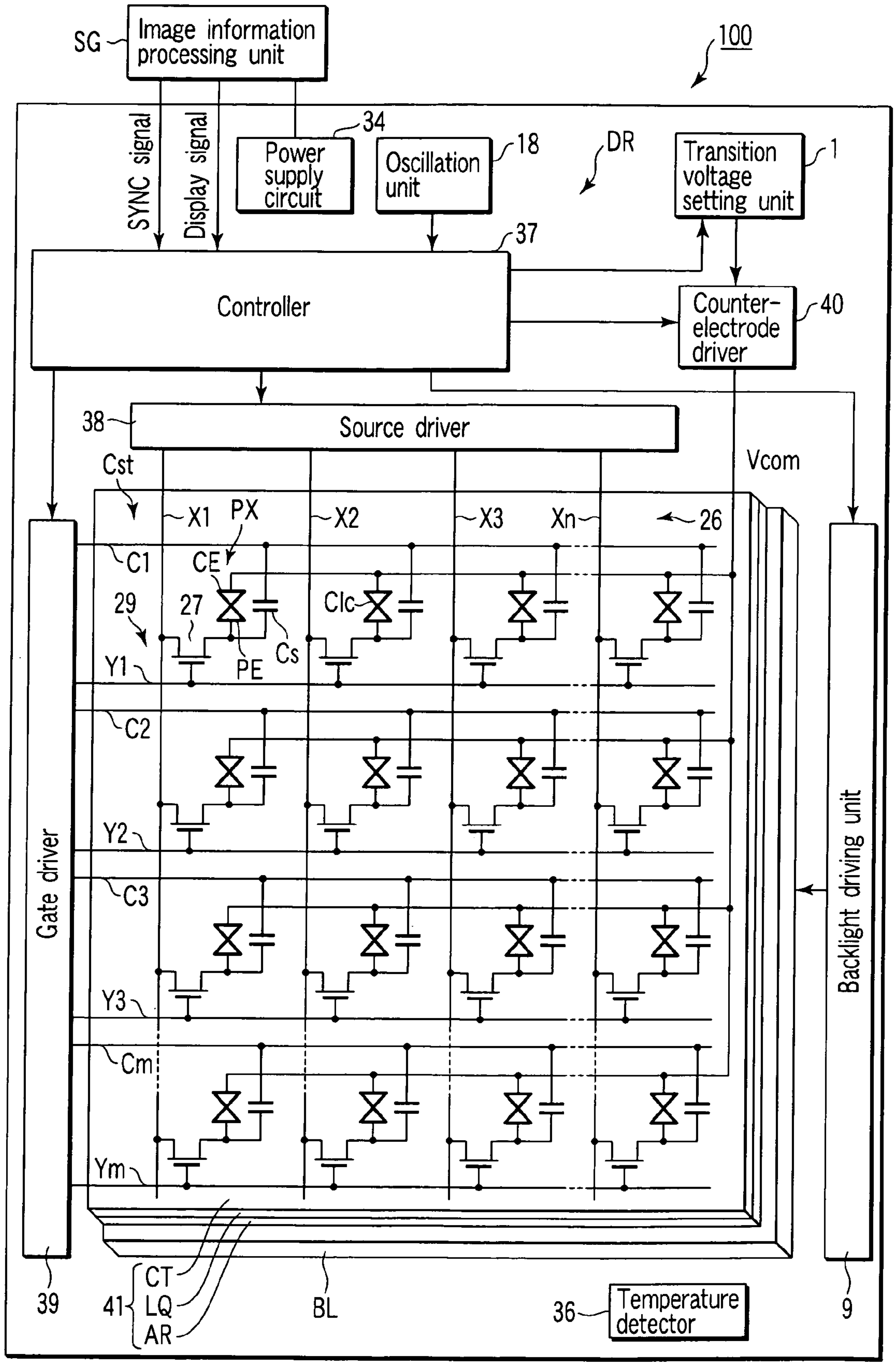
FIG. 1 is a diagram schematically showing the circuit configuration of a liquid crystal display device according to a first embodiment of the present invention.
Figure 2:
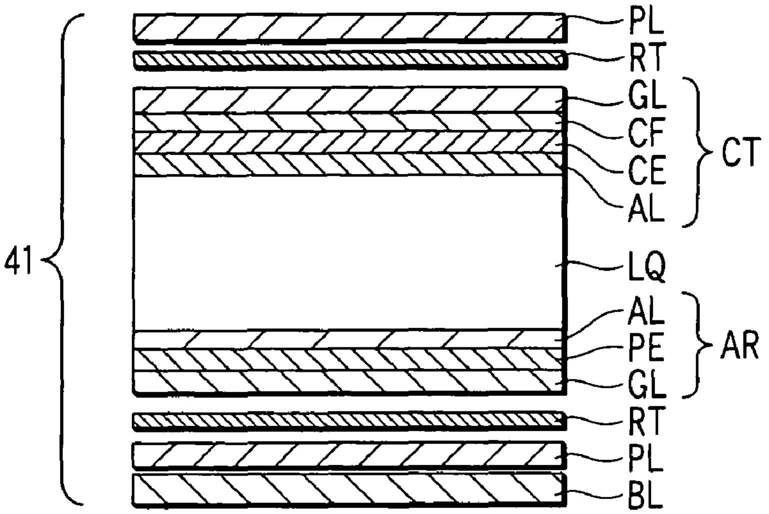
FIG. 2 is a diagram showing a partial cross-sectional structure of a liquid crystal display panel shown in FIG. 1.
Figure 3:
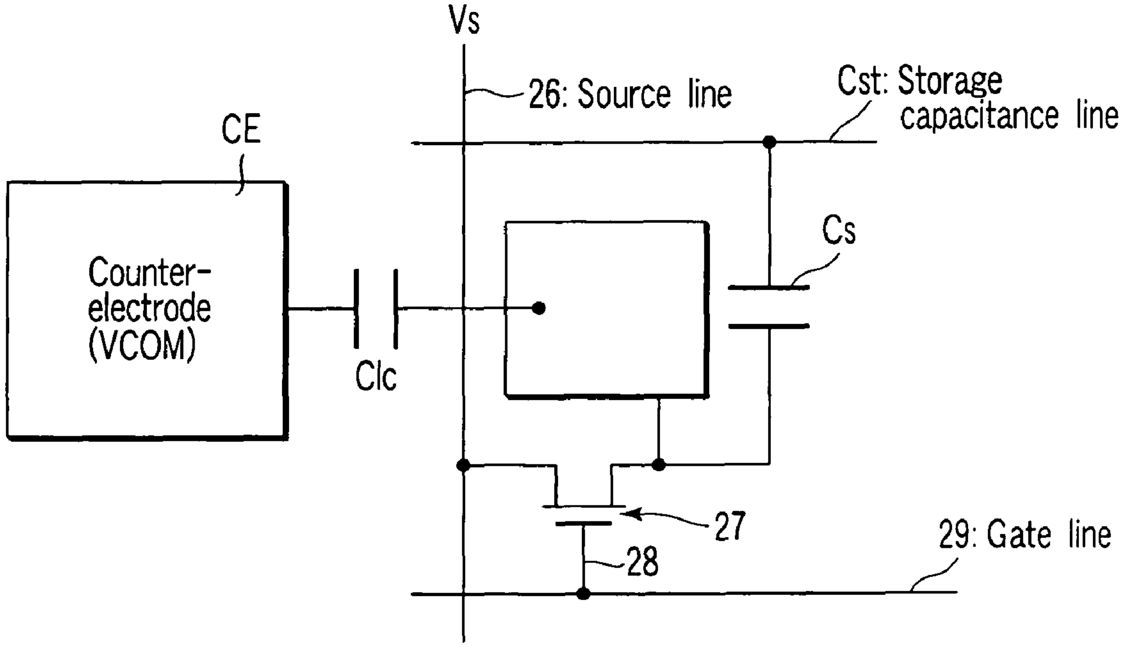
FIG. 3 is a diagram showing the circuit configuration of an OCB liquid crystal display element that performs display for one pixel with the cross-sectional structure shown in FIG. 2.

FIG. 1 schematically shows the circuit configuration of the liquid crystal display device 100, FIG. 2 shows a partial cross-sectional structure of a liquid crystal display (LCD) panel 41 shown in FIG. 1, and FIG. 3 shows the circuit configuration of an OCB liquid crystal display element PX that performs display for one pixel with the cross-sectional structure shown in FIG. 2.

The liquid crystal display device 100 is connected to an image information process unit SG provided as an external signal source, for example, in a TV set or a mobile phone. The image information processing unit SG performs an image information process to supply a sync signal and a display signal to the liquid crystal display device 100. A power supply voltage for the liquid crystal display device is also supplied from the image information process unit SG to the liquid crystal display device 100.

The liquid crystal display device 100 includes an LCD panel 41 that provides a matrix array (liquid crystal display element section) of OCB liquid crystal display elements PX; a backlight BL that illuminates the LCD panel 41; and a driving circuit DR that drives the LCD panel 41 and backlight BL. The LCD panel 41 includes an array substrate AR, a counter-substrate CT, and a liquid crystal layer LQ. The array substrate AR includes a transparent insulating substrate GL that is formed of, e.g. a glass plate; a plurality of pixel electrodes PE that are formed on the transparent insulating substrate GL; and an alignment film AL that covers the pixel electrodes PE. The counter-substrate CT includes a transparent insulating substrate GL that is formed of, e.g. a glass plate; a color filter layer CF that is formed on the transparent insulating substrate GL; a counter-electrode CE that is formed on the color filter layer CF; and an alignment film AL that covers the counter-electrode CE. The liquid crystal layer LQ is obtained by filling a liquid crystal in a gap between the counter-substrate CT and array substrate AR. The color filter layer CF includes a red color layer for red pixels, a green color layer for green pixels, a blue color layer for blue pixels, and a black color (light-shielding) layer for a black matrix. In addition, the LCD panel 41 includes a pair of retardation plates RT that are disposed on the outside of the array substrate AR and counter-substrate CT, and a pair of polarizers PL that are disposed on the outside of the retardation plates RT. The backlight BL is disposed, as a light source, on the outside of the polarizer PL that is disposed on the array substrate AR side. The alignment film AL on the array substrate AR side and the alignment film AL on the counter-substrate CT side are subjected to rubbing treatment in parallel directions.

In the array substrate AR, the pixel electrodes PE are arrayed substantially in a matrix on the transparent insulating substrate GL. In addition, a plurality of gate lines 29 (Y1 to Ym) are disposed along the rows of pixel electrodes PE, and a plurality of source lines 26 (X1 to Xn) are disposed along the columns of pixel electrodes PE. A plurality of pixel switches 27 are disposed near intersections between the gate lines 29 and source lines 26. Each of the pixel switches 27 is composed of a thin-film transistor that has a gate 28 connected to the gate line 29, and a source-drain path connected between the source line 26 and the pixel electrode PE. When the thin-film transistor is driven via the associated gate line 29, the thin-film transistor is rendered conductive between the associated source line 26 and the associated pixel electrode PE.

Each of the liquid crystal display elements PX has a liquid crystal capacitance Clc between the pixel electrode PE and the counter-electrode CE. Each of a plurality of storage capacitance lines Cst (C1 to Cm) is capacitive-coupled to the pixel electrode PE of each liquid crystal display element PX on the associated row, thereby constituting a storage capacitance Cs. The storage capacitance Cs has a sufficiently high capacitance value, relative to a parasitic capacitance of the pixel switch 27.

The driving circuit DR is configured to control the transmittance of the LCD panel 41 by a liquid crystal application voltage that is applied to the liquid crystal layer LQ from the array substrate AR and counter-substrate CT. Each of the OCB liquid crystal display elements PX serves as a pixel in a range of the associated pixel electrode PE. In the OCB liquid crystal display element PX, the alignment state of liquid crystal molecules needs to be transitioned from a splay alignment to a bend alignment capable of displaying an image, with the application of a transition voltage that is different from a normal driving voltage. For this purpose, each time the power is supplied, the driving circuit DR applies the transition voltage as a liquid crystal application voltage to the liquid crystal layer LQ, thereby performing initialization to transition the alignment state of liquid crystal molecules from the splay alignment to the bend alignment. In this specification, "OCB" means that birefringence due to the bend alignment is optically compensated. Examples of a structure for realizing optically compensated alignment includes a liquid crystal material, an alignment film, an optical film, etc. The term "OCB liquid crystal display elements" refers to liquid crystal display elements that display an image in an optically compensated alignment state.

The driving circuit DR, as a specific example, comprises a gate driver 39 that sequentially drives the gate lines 29 to turn on the switching elements 27 on a row-by-row basis; a source driver 38 that outputs pixel voltages Vs to the source lines 26 while the switching elements 27 on each row are kept conductive by the driving of the associated gate line 29; a counter-electrode driver 40 that drives the counter-electrode CE of the LCD panel 41; a backlight driving unit 9 that drives the backlight BL; a controller 37 that controls the gate driver 39, source driver 38, counter-electrode driver 40 and backlight driving unit 9; and a power supply circuit 34 that generates a plurality of internal power supply voltages, which are necessary for the gate driver 39, source driver 38, counter-electrode driver 40, backlight driving unit 9 and controller 37, from power (specifically, power supply voltage) that is supplied from the image information processing unit SG to the driving circuit DR.

The controller 37 outputs to the gate driver 39 a vertical timing control signal that is generated on the basis of the sync signal input from the image information processing unit SG. The controller 37 outputs to the source driver 38 a horizontal timing control signal and pixel data for one horizontal line, which are generated on the basis of the sync signal and display signal input from the image information processing unit SG. In addition, the controller 37 outputs an illumination control signal to the backlight driving unit 9. The gate driver 39 sequentially selects the gate lines 29 in one frame period under the control of the vertical timing control signal, and outputs to the selected gate line 29 a gate driving voltage that renders conductive the pixel switches 27 on the associated row for one horizontal scan period H. The source driver 38 converts, under the control of the horizontal timing control signal, pixel data for one horizontal line to pixel voltages Vs during one horizontal scan period H in which the gate driving voltage is output to the selected gate line 29, and outputs the pixel voltages Vs to the source lines 26 in parallel.

The pixel voltage Vs is a voltage that is applied to the pixel electrode PE with a common voltage Vcom used as a reference and output from the counter-electrode driver 40 to the counter-electrode CE. For example, the polarity of the pixel voltage Vs is reversed with respect to the common voltage Vcom in a frame-reversal drive scheme or a line-reversal drive scheme. When the switching elements 27 for one row are rendered nonconductive, the gate driver 39 applies a compensation voltage Vcs to a storage capacitance line Cst corresponding to the gate line 29 connected to these switching elements 27, thereby compensating variations in pixel voltages Vs, which occur in the liquid crystal display elements PX for one row due to the parasitic capacitance of the switching elements 27.

Figure 4:
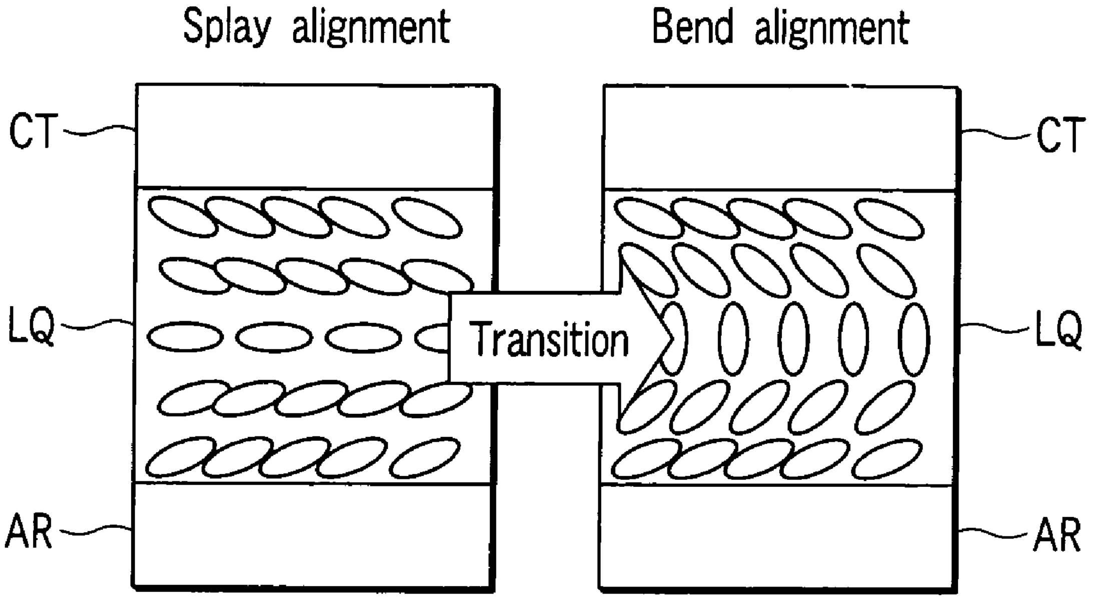
FIG. 4 is a diagram showing the alignment state of liquid crystal molecules, which is transitioned from a splay alignment to a bend alignment by a transition voltage that is applied as a liquid crystal application voltage to the OCB liquid crystal display element shown in FIG. 3.

In the liquid crystal display device 100, the driver circuit DR includes a transition voltage setting unit 1. The transition voltage setting unit 1 performs a transition voltage setting process for applying a transition voltage that causes the alignment state of liquid crystal molecules to be transitioned from the splay alignment to the bend alignment, as shown in FIG. 4, to each liquid crystal display element PX as a liquid crystal application voltage. The transition voltage is so set that the potential of the counter-electrode CE determined by the common voltage Vcom from the counter-electrode driver 40 may shift in a predetermined form in relation to the potential of the pixel electrode PE determined by the pixel voltage Vs from the source driver 38.

In addition, the driving circuit DR includes an oscillation unit 18 for generating a clock signal to be supplied to the transition voltage setting unit 1. The clock signal is used as a reference for starting the application of the transition voltage in the transition voltage setting process performed by the transition voltage setting unit 1, and for measuring the time period of the application of the transition voltage. In addition, a temperature detector 36 is provided in order to detect the ambient temperature of the matrix array of OCB liquid crystal display elements PX provided in the LCD panel 41.

Figure 5:
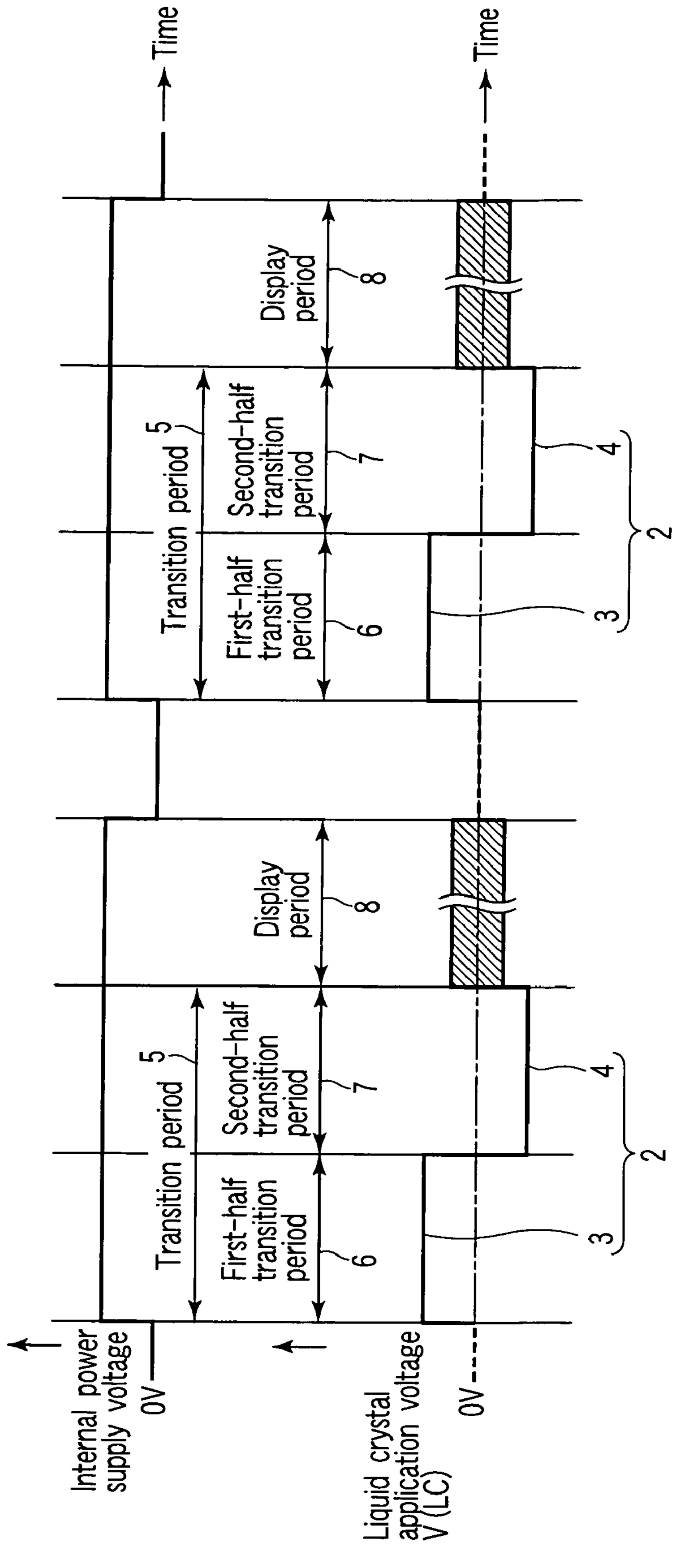
FIG. 5 is a waveform diagram illustrating an operation of the liquid crystal display device shown in FIG. 1.

The liquid crystal display device 100 operates, as shown in FIG. 5, with a power supply voltage that is supplied from the image information processing unit SG to the driving circuit DR.

The power supply circuit 34 converts the power supply voltage to a plurality of internal power supply voltages and supplies the internal power supply voltages to the controller 37, source driver 38, gate driver 39, counter-electrode driver 40 and backlight driving unit 9. The oscillation unit 18 supplies a clock signal to the transition voltage setting unit 1 via the controller 37 in response to the power supply voltage from the power supply circuit 34. The transition voltage setting unit 1 performs the transition voltage setting process, and applies, from the timing of the supply of the clock signal, the transition voltage as a liquid crystal application voltage to each liquid crystal display element PX. In the transition voltage setting process, in a transition period 5, the transition voltage alternately changes to values with different polarities, which cause the alignment state of liquid crystal molecules to be transitioned from the splay alignment to the bend alignment. The transition period 5 includes a first-half transition period 6 and a second-half transition period 7, which are substantially equal. The transition voltage 2 is set at a voltage 3 of a first polarity, i.e. a positive polarity, in the first-half transition period 6, and set at a voltage 4 of a second polarity, i.e. a negative polarity, in the second-half transition period 7. In this case, the pixel voltage Vs is fixed, and the common voltage Vcom output from the counter-electrode driver 40 is varied so as to obtain the above-described transition voltage 2. The transition voltage setting unit 1 confirms the elapse of the transition period 5 by counting the clock signal, and completes the transition voltage setting process.

In a subsequent display period 8, the controller 37 fixes the common voltage Vcom to be output from the counter-electrode driver 40, and controls the source driver 38, gate driver 39 and counter-electrode driver 40 to apply a liquid crystal application voltage, which is obtained by varying the pixel voltage Vs in accordance with the pixel data, to each liquid crystal display element PX. Thereby, the matrix array of liquid crystal display elements PX is enabled to display an image. The above-described operation ends when the supply of the power supply voltage to the driving circuit DR is stopped, and the operation is repeated in the same manner when the power supply voltage is supplied again.

According to the above-described first embodiment, the transition voltage 2, which is applied to the OCB liquid crystal display elements PX in order to transition the alignment state of liquid crystal molecules from the splay alignment to the bend alignment, is alternately set at the value 3 of the first polarity that is the positive polarity and at the value 4 of the second polarity that is the negative polarity. Specifically, the transition voltage 2 is applied as AC voltage to each liquid crystal display element PX in order to transition the alignment state of liquid crystal molecules from the splay alignment to the bend alignment. It is thus possible to prevent non-uniform distribution of liquid crystal molecules, which occurs in the initialization for transitioning the alignment state of liquid crystal molecules from the splay alignment to the bend alignment. As a result, it is possible to completely transition the alignment state of liquid crystal molecules from the splay alignment to the bend alignment, and to reduce flicker of an image that is displayed by the matrix array of OCB liquid crystal display elements PX. Moreover, since the transition voltage setting unit 1 shifts the common voltage of the counter-electrode CE to obtain the transition voltage, it is possible to set the transition voltage at a high value, regardless of the withstand voltage of the source driver 38.

It is preferable that the output of the oscillation unit 18 is connected to a clock terminal of the controller 37, and a transition control signal is output from the transition voltage setting unit 1 via the controller 37 and the transition voltage is applied to the OCB liquid crystal display elements PX by the time when the image processing unit SG is completely activated. Thereby, in such a case that a length of time is needed until receiving a clock signal such as a sync signal from the image processing unit SG, the controller 37 can be activated in advance by the clock signal from the oscillation unit 18, and the initialization for transitioning the splay alignment to the bend alignment can be started earlier. Thus, the time that is needed until the completion of the initialization can be decreased.

Preferably, the transition period 5 should be set to be long when the ambient temperature, which is detected by the temperature detector 36, becomes lower than normal temperature. It is possible to ensure transition at low temperatures. In the meantime, the temperature dependency of the transition can be eliminated by varying at least one of the length of the transition period 5 and the voltage amplitude of the transition voltage in accordance with the ambient temperature.

Figure 6:
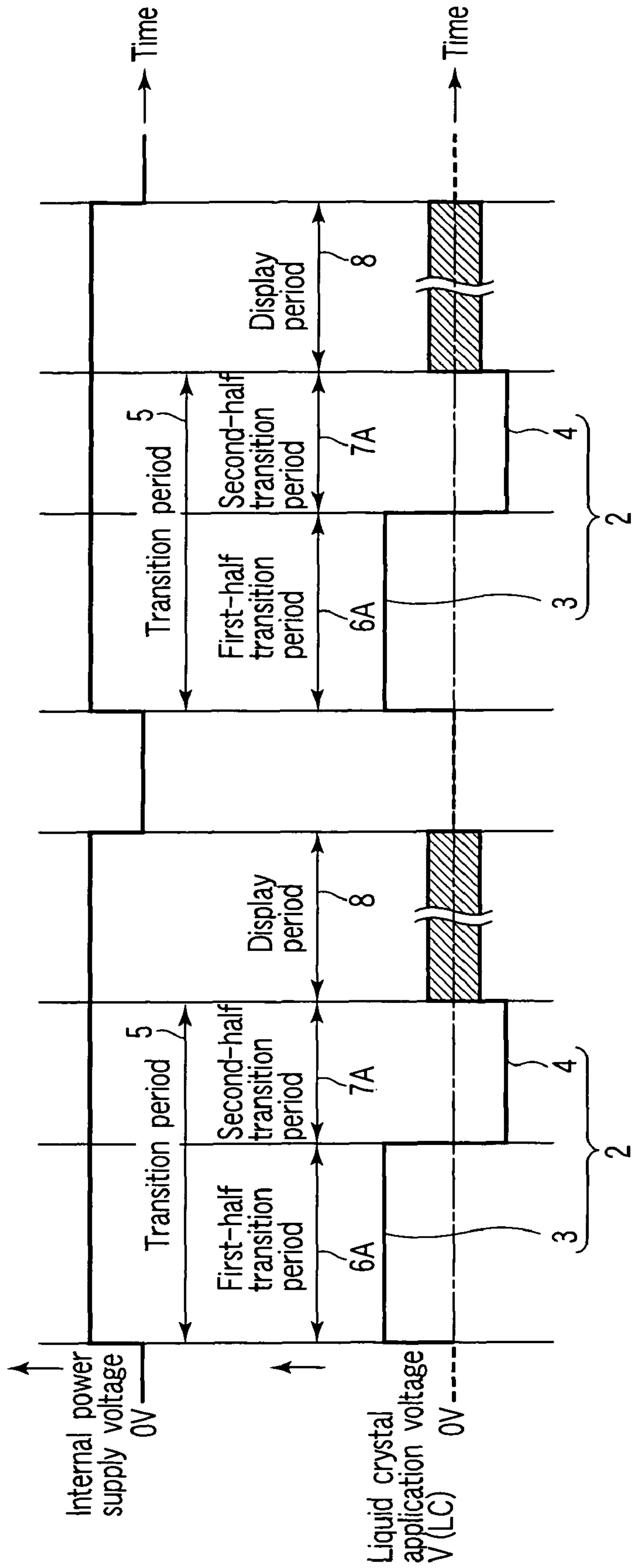
FIG. 6 is a waveform diagram illustrating an operation obtained by a first modification of the driving circuit shown in FIG. 1.

FIG. 6 illustrates an operation obtained by a first modification of the driving circuit DR. The structural elements in FIG. 6, which are common to those in FIG. 5, are denoted by the same reference symbols, and a detailed description thereof is omitted. The difference is that the driving circuit DR of this modification is configured such that the transition period 5 includes a first-half transition period 6A and a second-half transition period 7A as shown in FIG. 6, instead of including the first-half transition period 6 and second-half transition period 7 shown in FIG. 5. The first-half transition period 6A, in which the voltage 3 of the first polarity that is the positive polarity is applied, is longer than the second-half transition period 7A, in which the voltage 4 of the second polarity that is the negative polarity is applied. The absolute value of the voltage 3 of the first polarity, which is applied in the first-half transition period 6A, is greater than the absolute value of the voltage 4 of the second polarity, which is applied in the second-half transition period 7A.

The length of the first-half transition period 6A is not necessarily equal to the length of the second-half transition period 7A. The absolute value of the transition voltage is not necessarily equal between the first-half transition period 6A and the second-half transition period 7A. In order to decrease the transition period 5, the first-half transition period 6A may be set to be longer than the second-half transition period 7A, or the absolute value of the voltage 3 of the first polarity may be set to be greater than the absolute value of the voltage 4 of the second polarity. Further, in order to decrease the transition period 5, the second-half transition period 7A may be set to be longer than the first-half transition period 6A, or the absolute value of the second-polarity voltage 4 may be set to be greater than the absolute value of the first-polarity voltage 3. Preferably, an integral value, which is obtained by integrating the first-polarity voltage during the time period of application of the first-polarity voltage, should be equal to an integral value, which is obtained by integrating the second-polarity voltage during the time period of application of the second-polarity voltage in order to prevent a DC component from remaining.

Figure 7:
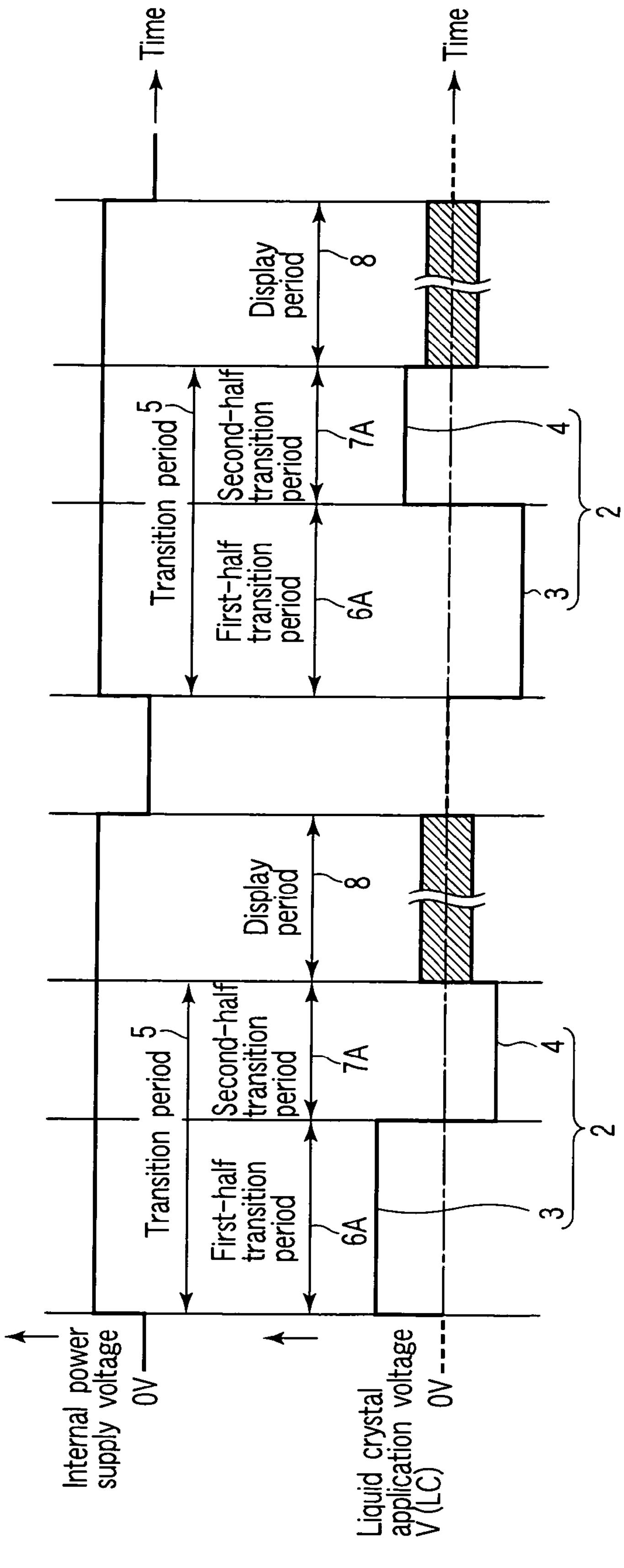
FIG. 7 is a waveform diagram illustrating an operation obtained by a second modification of the driving circuit shown in FIG. 1.

FIG. 7 illustrates an operation obtained by a second modification of the driving circuit DR. The structural elements in FIG. 7, which are common to those in FIG. 6, are denoted by the same reference symbols, and a detailed description thereof is omitted. The difference is that the driving circuit DR of this modification is configured to apply a voltage 4 of the second polarity, which is the negative polarity, during the first-half transition period 6A in the second transition period 5, and to apply a voltage 3 of the first polarity, which is the positive polarity, during the second-half transition period 7A.

If the order of the application of the voltage 3 of the first polarity, which is the positive polarity, and the voltage 4 of the second polarity, which is the negative polarity, is reversed each time the power supply circuit 34 is turned on and off, as described above, flicker of an image, which is displayed by the matrix array of OCB liquid crystal display elements PX, can further be reduced.

Figure 8:
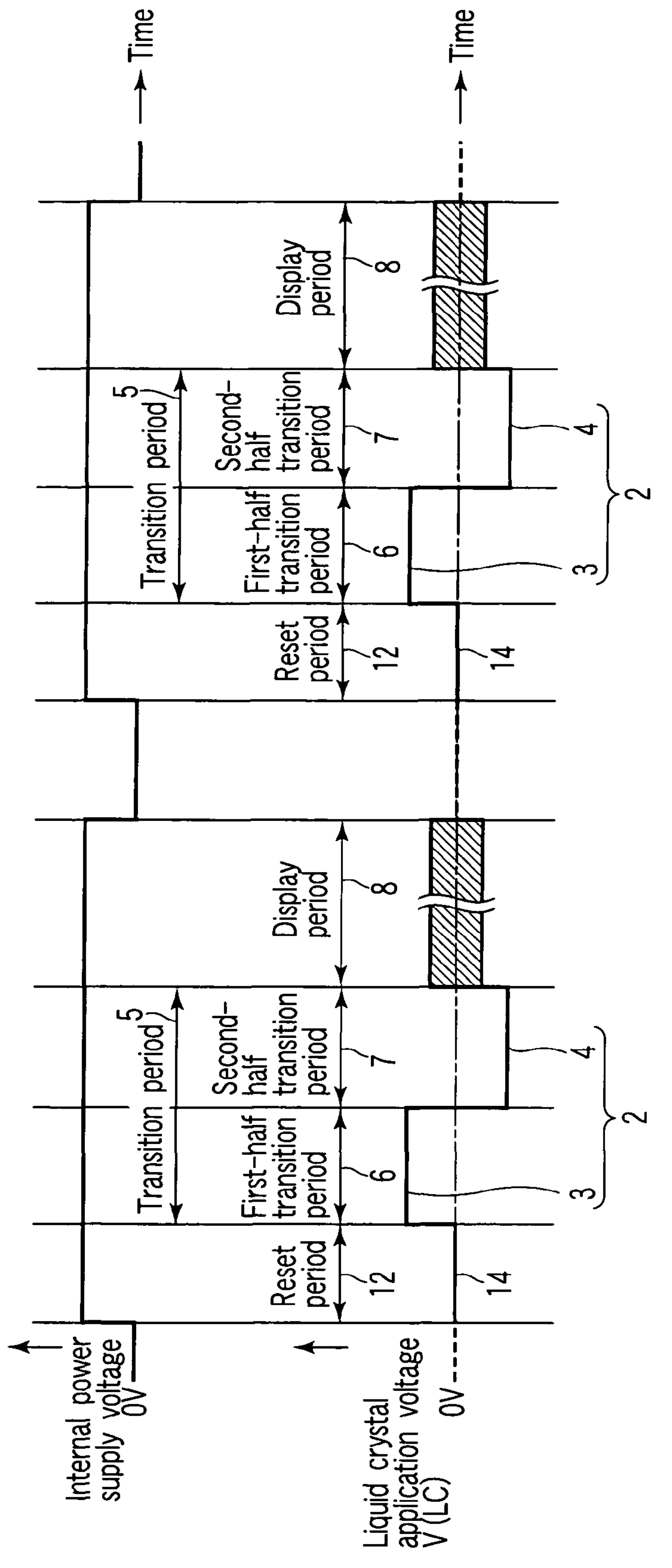
FIG. 8 is a waveform diagram illustrating an operation obtained by a third modification of the driving circuit shown in FIG. 1.

FIG. 8 illustrates an operation obtained by a third modification of the driving circuit DR. The structural elements in FIG. 8, which are common to those in FIG. 5, are denoted by the same reference symbols, and a detailed description thereof is omitted. The difference is that the driving circuit DR of this modification is configured to apply a reset voltage 14 for uniformizing the alignment of liquid crystal molecules in a reset period 12 provided prior to the transition period 5. The reset period 12 is about 500 ms as a whole. The reset voltage 14 is substantially 0 V. If the reset voltage 14 is applied in the reset period 12 provided prior to the transition period 5, it becomes possible to improve the transition performance for transitioning the alignment state of liquid crystal molecules from the splay alignment to the bend alignment. The reset voltage that is applied as common voltage Vcom may be equivalent to a voltage for displaying white. However, in order to completely reset the potential difference between the pixel electrode PE and counter-electrode CE, it is preferable to adapt the reset to the compensation voltage Vcs of the storage capacitance Cs and the pixel voltage Vs, and to set the reset voltage at about ½ of the reference voltage for maximizing the pixel voltage Vs.

Preferably, the sum of the reset period 12 and the transition period 5 should be set to be long when the ambient temperature, which is detected by the temperature detector 36, becomes lower than normal temperature. This ensures transition at low temperatures. In the meantime, the temperature dependency of the transition can be cancelled by varying at least one of the length of the sum of the reset period 12 and transition period 5 and the voltage amplitude of the transition voltage in accordance with the ambient temperature.

Figure 9:
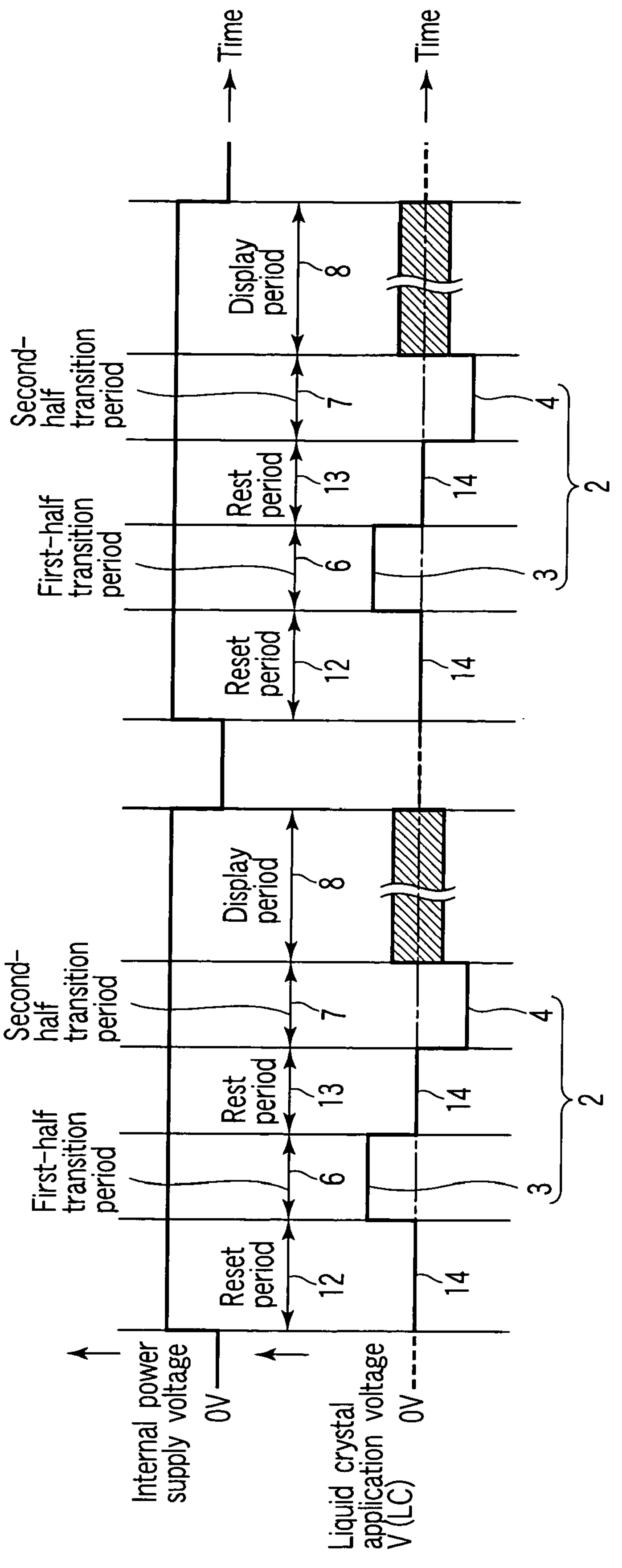
FIG. 9 is a waveform diagram illustrating an operation obtained by a fourth modification of the driving circuit shown in FIG. 1.

FIG. 9 illustrates an operation obtained by a fourth modification of the driving circuit DR. The structural elements in FIG. 9, which are common to those in FIG. 8, are denoted by the same reference symbols, and a detailed description thereof is omitted. The difference is that the driving circuit DR of this modification is configured to further apply a predetermined voltage equivalent to a reset voltage 14 for uniformizing the alignment state of liquid crystal molecules, in a rest period 13 for withstand-voltage relaxation, which is provided between the first-halt transition period 6 and second-half transition period 7. The rest period 13 for withstand-voltage relaxation is approximately equal to 1H to 4H (H: horizontal scan period). The reset voltage 14, for example, can practically be realized by applying such a potential (including 0 V) as to equalize the common voltage Vcom, the voltage Vcs on the storage capacitance line Cst and the voltage Vs on the source line 26. If the predetermined voltage equivalent to the reset voltage 14 is applied in the rest period 13 for withstand-voltage relaxation, which is provided between the first-halt transition period 6 and second-half transition period 7, it becomes possible to lower the withstand voltage of the driving circuit DR, and to enhance the reliability of the transition performance for transitioning the alignment state of liquid crystal molecules from the splay alignment to the bend alignment.

Figure 10:
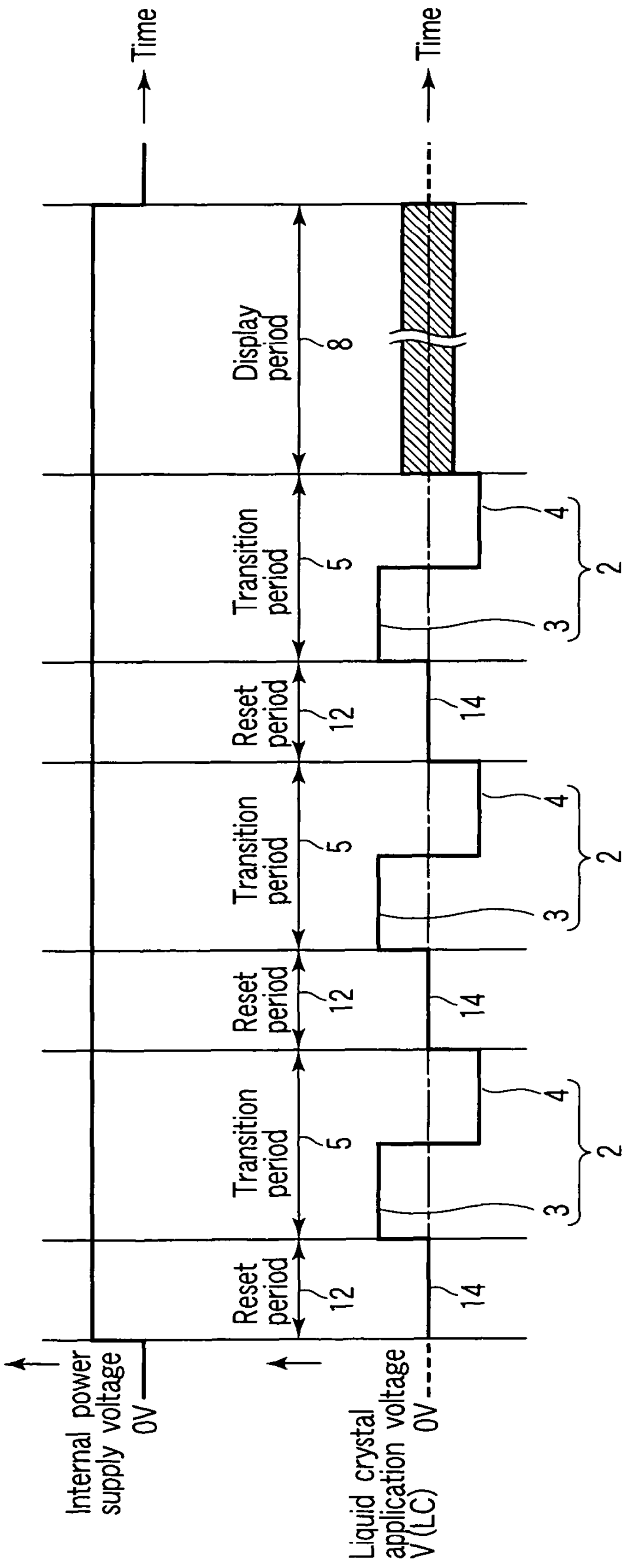
FIG. 10 is a waveform diagram illustrating an operation obtained by a fifth modification of the driving circuit shown in FIG. 1.

FIG. 10 illustrates an operation obtained by a fifth modification of the driving circuit DR. The structural elements in FIG. 10, which are common to those in FIG. 8, are denoted by the same reference symbols, and a detailed description thereof is omitted. The difference is that the driving circuit DR of this modification is configured to repeat three times the application of the reset voltage 14 in the reset period 12 and the application of the transition voltage 2 in the transition period 5 in the named order. If the application of the reset voltage 14 and the application of the transition voltage 2 are repeated more than once, the absolute values of the first-polarity voltage 3 and second-polarity voltage 4, which constitute the transition voltage 5, can be decreased.

Figure 11:
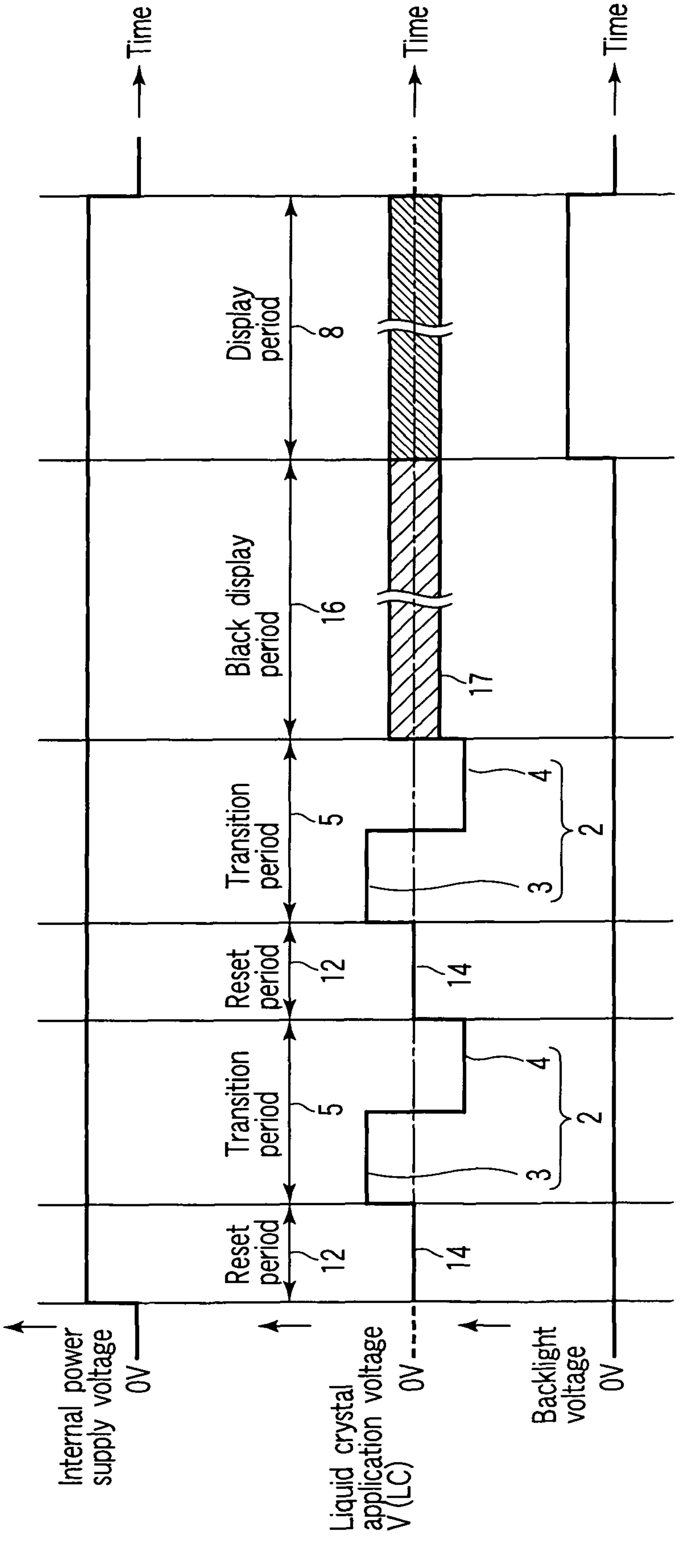
FIG. 11 is a waveform diagram illustrating an operation obtained by a sixth modification of the driving circuit shown in FIG. 1.

FIG. 11 illustrates an operation obtained by a sixth modification of the driving circuit DR. The structural elements in FIG. 11, which are common to those in FIG. 8, are denoted by the same reference symbols, and a detailed description thereof is omitted. The difference is that the driving circuit DR of this modification is configured to output a backlight voltage in the display period 8, thereby turning on the backlight BL. The transition voltage setting unit 1 applies to each OCB liquid crystal display element PX a black-display voltage 17 for effecting black display in a black display period 16, which is provided after the second transition period 4 and before the display period 8. If the black-display voltage 17 is applied to the OCB liquid crystal display elements PX after the application of the transition voltage until the backlight is turned on, the alignment state of liquid crystal molecules, which have not completely transitioned from the splay alignment to the bend alignment, can completely be transitioned to the bend alignment.

Figure 12:
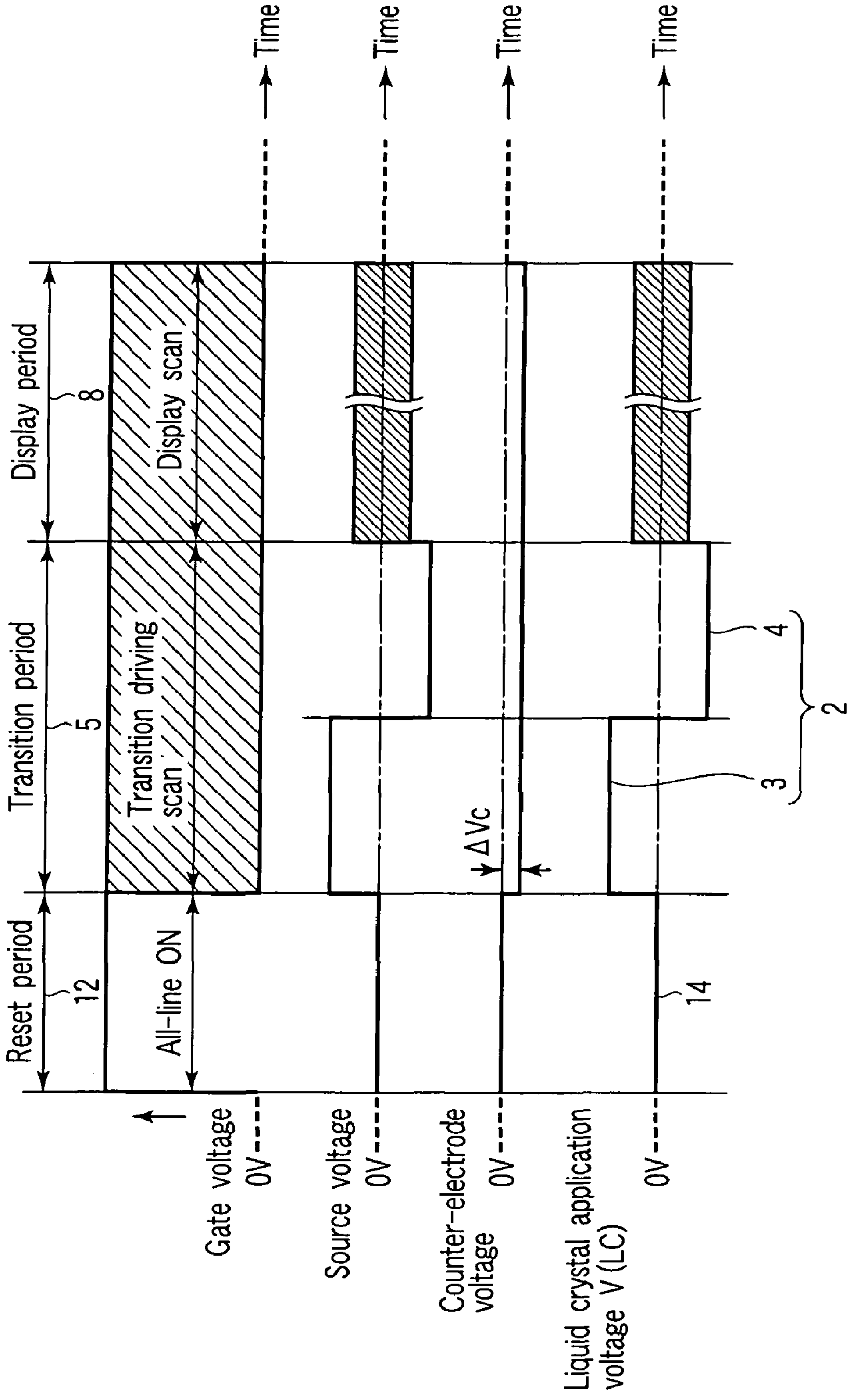
FIG. 12 is a waveform diagram illustrating an operation obtained by a seventh modification of the driving circuit shown in FIG. 1.

FIG. 12 illustrates an operation obtained by a seventh modification of the driving circuit DR. The structural elements in FIG. 12, which are common to those in FIG. 8, are denoted by the same reference symbols, and a detailed description thereof is omitted. In this modification, the transition voltage 2, which is set by the transition voltage setting unit 1, is applied to the source line 26 via the source driver 38 during the transition period 5. A negative voltage ΔVc is applied to the counter-electrode CE via the counter-electrode driver 40 during the transition period 5 and display period 8 under the control of the controller 37. The pixel switches (TFTs) 27 of all lines are turned on during the reset period 12 by the gate (28) control.

Figure 13:
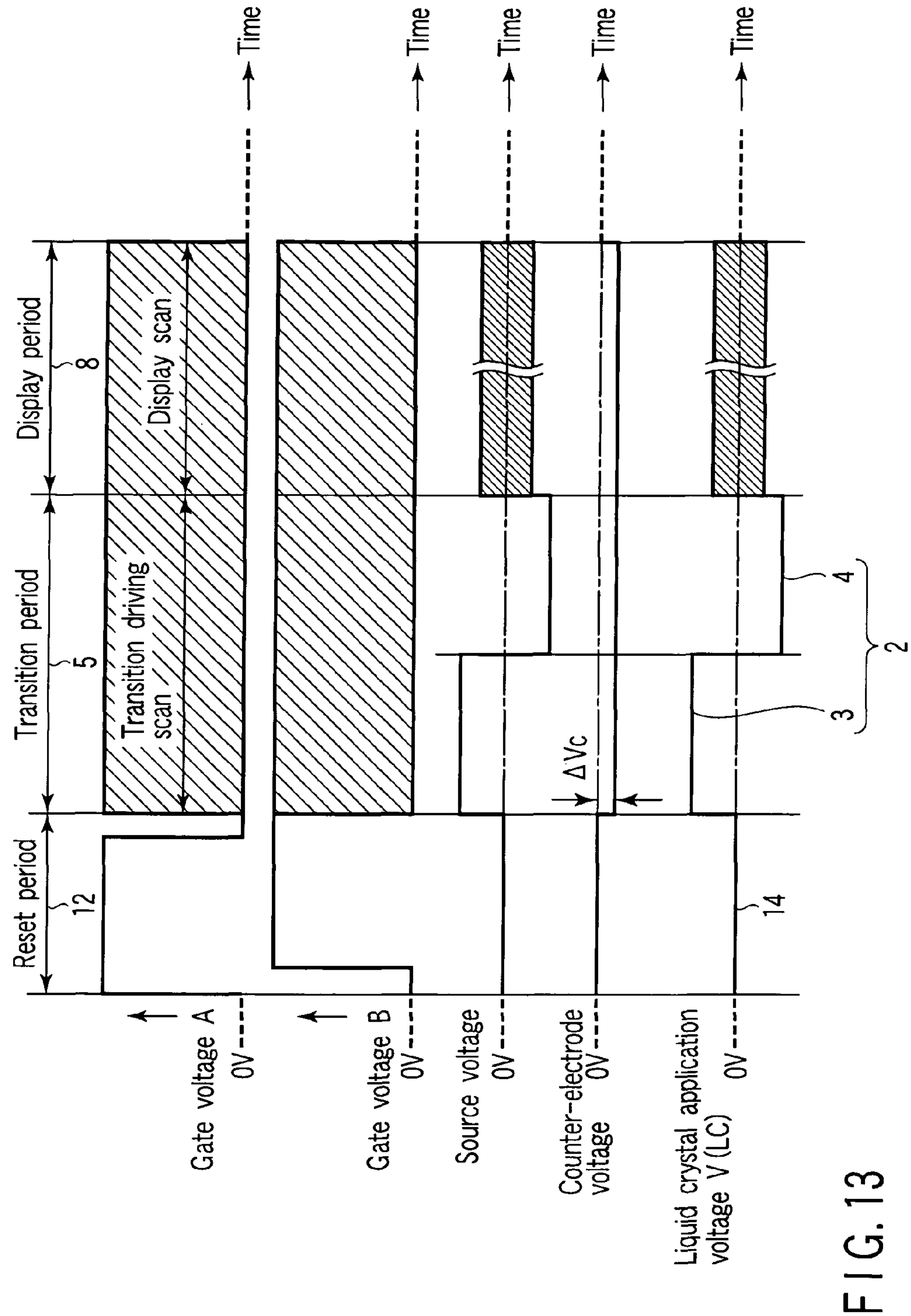
FIG. 13 is a waveform diagram illustrating an operation obtained by an eighth modification of the driving circuit shown in FIG. 1.

FIG. 13 illustrates an operation obtained by an eighth modification of the driving circuit DR. The structural elements in FIG. 13, which are common to those in FIG. 12, are denoted by the same reference symbols, and a detailed description thereof is omitted. In this modification, the gate driver 39 is configured to turn on pixel switches (TFTs) 27 in the reset period 12 on a row-by-row (line-by-line) basis in a discrete fashion. The pixel switches (TFTs) 27 are turned on in the reset period 12 on the line-by-line basis by the gate (28) control. If the time of the turn-on of the pixel switches 27 by the gate (28) control is discretely set within the reset period 12 between the plural lines, a rush current can be reduced. In the meantime, the gate lines 29 are driven one by one, but the gate lines 29 may be driven in units of two or more.

Figure 14:
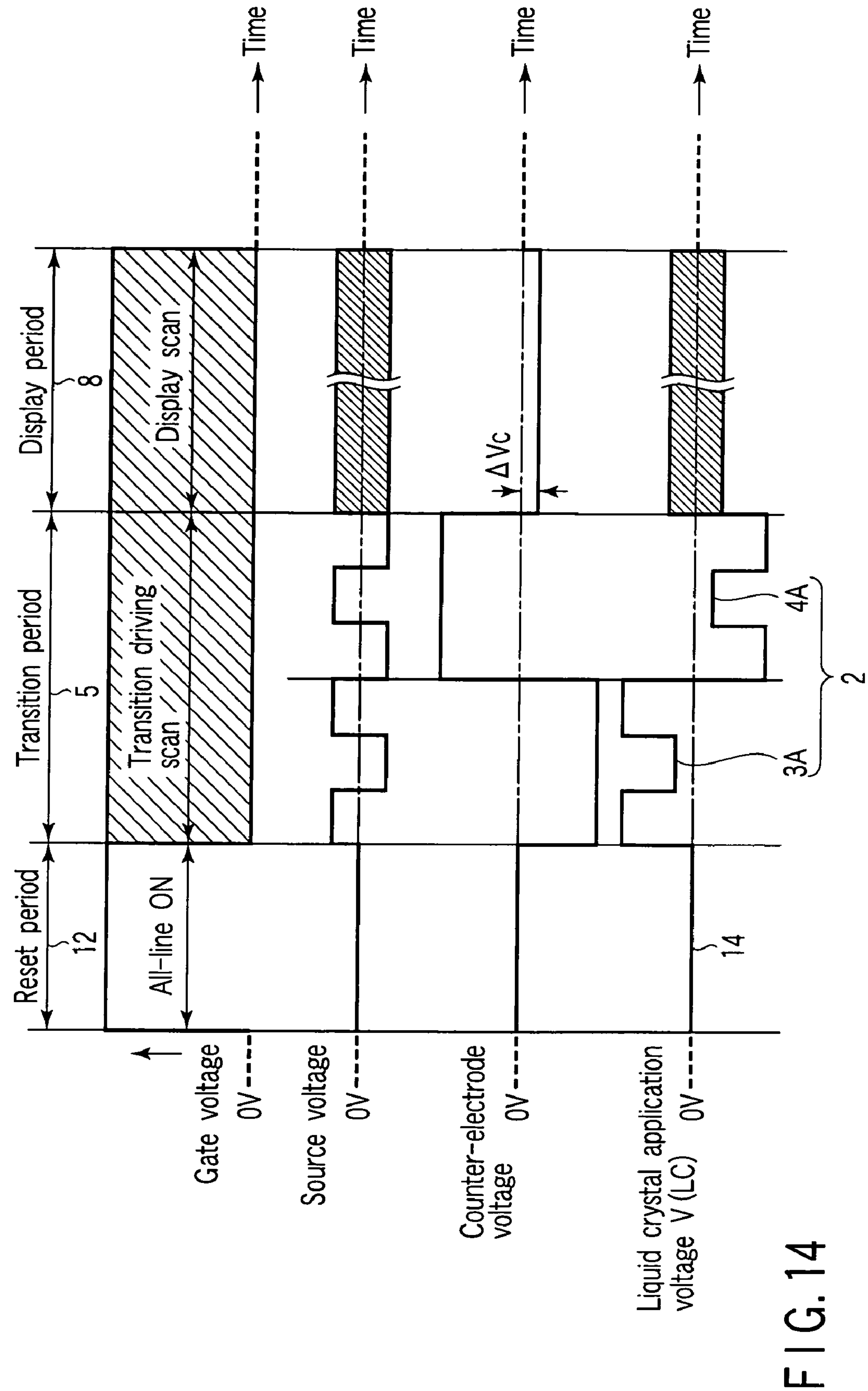
FIG. 14 is a waveform diagram illustrating an operation obtained by a ninth modification of the driving circuit shown in FIG. 1.

FIG. 14 illustrates an operation obtained by a ninth modification of the driving circuit DR. The structural elements in FIG. 14, which are common to those in FIG. 12, are denoted by the same reference symbols, and a detailed description thereof is omitted. In this modification, the gate driver 39 concurrently drives all the gate lines 29 during the reset period 12. In the subsequent transition period 5, the transition voltage that is set by the transition voltage setting unit 1 is applied to the counter-electrode CE via the counter-electrode driver 40. In the transition period 5, a rectangular source voltage is applied to the pixel electrode PE. The transition voltage 2 that comprises the first-polarity voltage 3A and second-polarity voltage 4A, which are produced by mixing the transition voltage applied to the counter-electrode CE and the rectangular source voltage (pixel voltage) applied to the pixel electrode PE, is applied to the OCB liquid crystal display elements PX.

Figure 15:
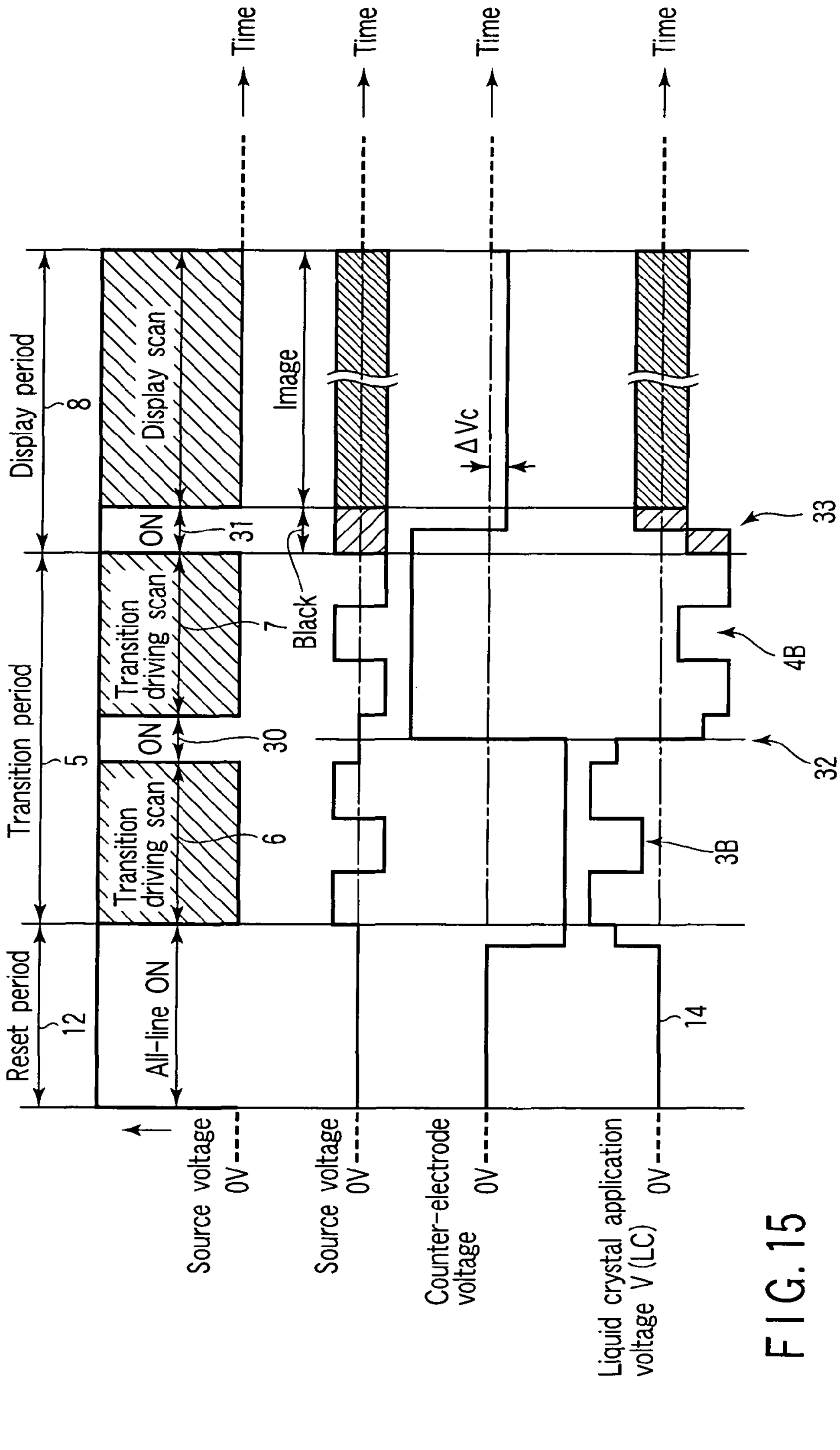
FIG. 15 is a waveform diagram illustrating an operation obtained by a tenth modification of the driving circuit shown in FIG. 1.

FIG. 15 illustrates an operation obtained by a tenth modification of the driving circuit DR. The structural elements in FIG. 15, which are common to those in FIG. 14, are denoted by the same reference symbols, and a detailed description thereof is omitted. In this modification, the transition period 5 includes a first-half transition period 6 and a second-half transition period 7 that follows the first-half transition period 6. The pixel switches (TFTs) 27 are turned on by the gate (28) control in a predetermined period 30 including a timing in which the first-half transition period 6 transitions to the second-half transition period 7. In the first-half transition period 6, a first-polarity voltage 3B is applied to the OCB liquid crystal display elements PX. In the second-half transition period 7, a second-polarity voltage 4B is applied to the OCB liquid crystal display elements PX.

In the period 30, a white-display voltage 32 for effecting white display is applied to the OCB liquid crystal display elements PX. In a predetermined period 31 at the beginning of the display period 8, which follows the transition period 5, the pixel switches (TFTs) 27 are turned on by the gate (28) control. In the period 31, a black-display voltage 33 for effecting black display is applied to the OCB liquid crystal display elements PX.

Figure 16:
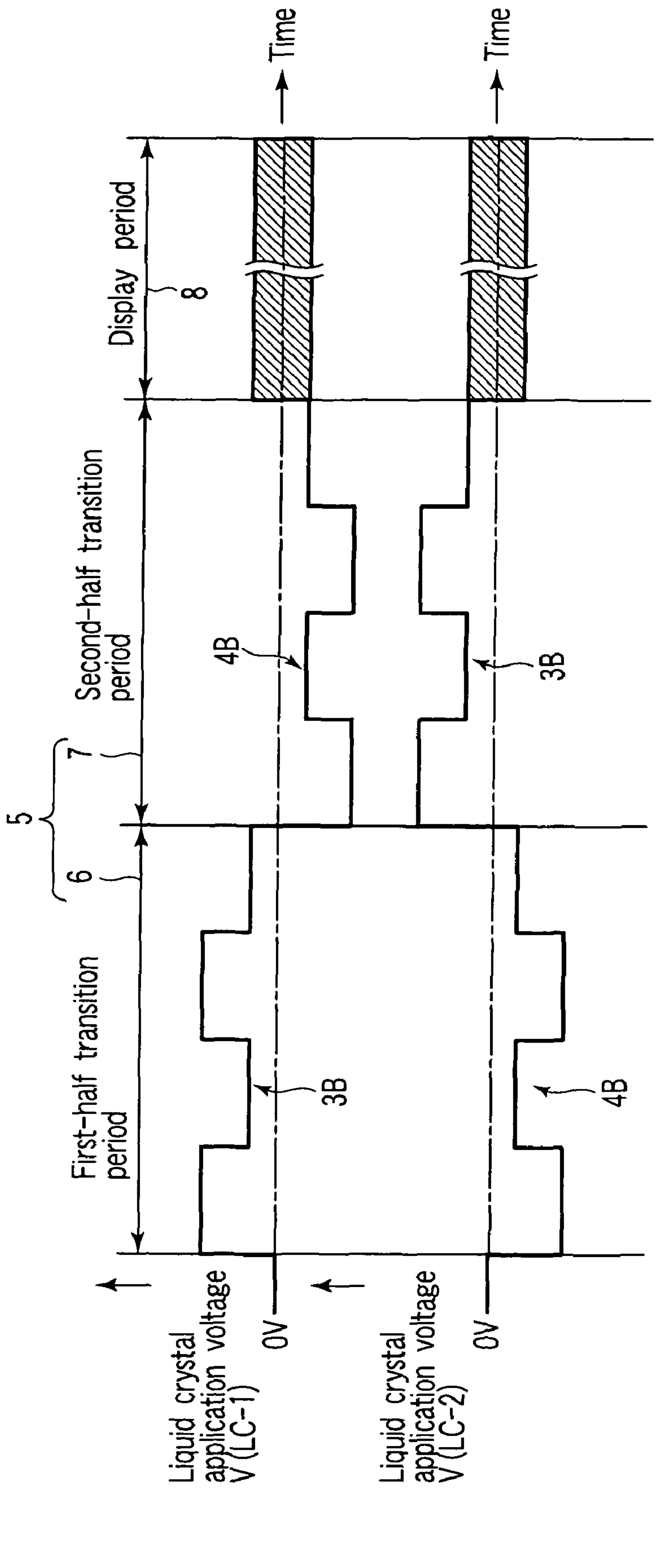
FIG. 16 is a waveform diagram illustrating an operation obtained by an eleventh modification of the driving circuit shown in FIG. 1.
Figure 17:
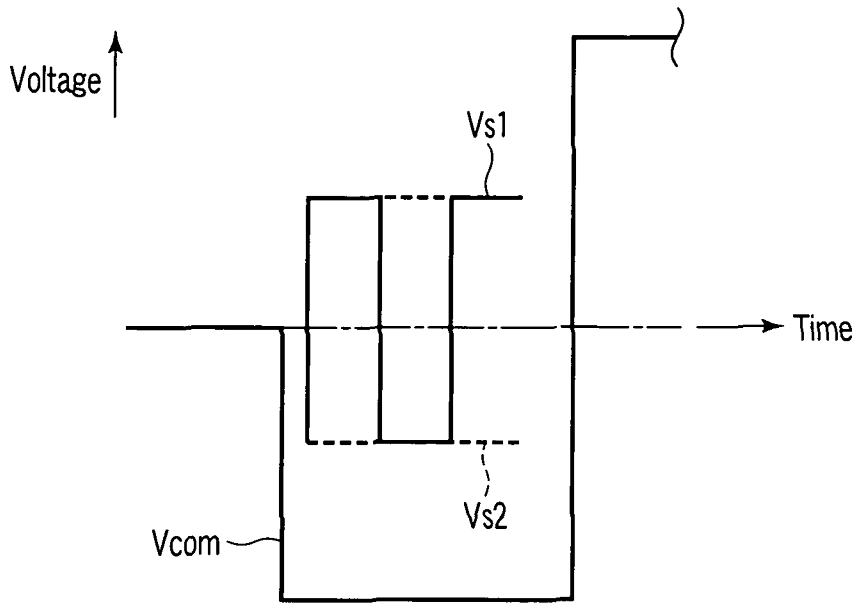
FIG. 17 is a waveform diagram showing a voltage waveform applied to the counter-electrode, and a voltage waveform applied to the pixel electrode, in the operation illustrated in FIG. 16.
Figure 18:
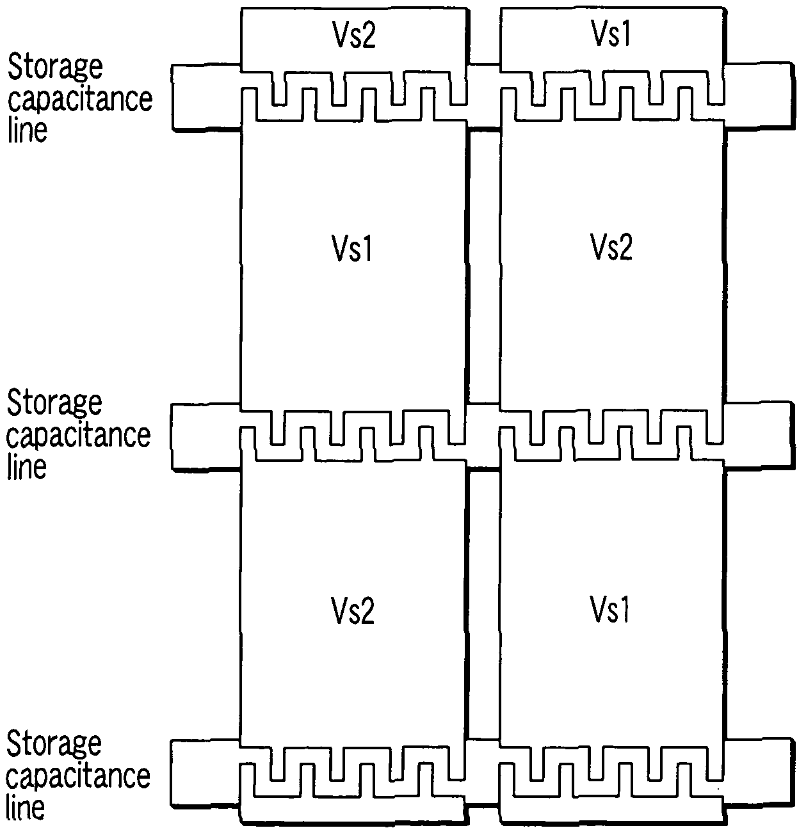
FIG. 18 is a plan view showing an arrangement of pixels that are driven by a dot-reversal drive scheme in the operation illustrated in FIG. 16.

FIG. 16 illustrates an operation obtained by an eleventh modification of the driving circuit DR, FIG. 17 is a waveform diagram showing a voltage waveform, which is applied to the counter-electrode, and a voltage waveform, which is applied to the pixel electrode, in the operation illustrated in FIG. 16, and FIG. 18 shows an arrangement of pixels that are driven by a dot-reversal drive scheme in the operation illustrated in FIG. 16. The structural elements in FIG. 16, which are common to those in FIG. 15, are denoted by the same reference symbols, and a detailed description thereof is omitted. In this modification, a disturbing drive scheme is additionally executed in order to realize high reliability of transition. In the disturbing drive scheme, as illustrated in FIG. 17, in the transition period, a transition voltage, which is the common voltage Vcom, is applied to the counter-electrode CE, and a disturbing voltage VS1, which has a higher frequency than the transition voltage, is applied as a pixel voltage to the pixel electrode PE. Thus, the OCB liquid crystal display elements PX are driven.

In the disturbing drive scheme, as illustrated in FIG. 18, it is preferable to perform a dot-reversal drive scheme in the following manner. That is, the disturbing voltage VS1 is applied to the pixel electrode PE of a given OCB liquid crystal display element PX. A disturbing voltage VS2, which has a polarity opposite to the polarity of the disturbing voltage VS1, is applied to the pixel electrode PE of each of OCB liquid crystal display elements PX that neighbor the given OCB liquid crystal display element PX in the vertical and horizontal directions. In the case where the dot-reversal drive scheme is performed, a lateral electric field, which generates a nucleus for facilitating the bend alignment, can be obtained between the liquid crystal display elements PX that neighbor in the vertical and horizontal directions.

As is shown in FIG. 18, it is preferable that the end portions of the pixel electrodes PE of the mutually neighboring OCB liquid crystal display elements PX be formed in zigzag shapes. The alignment state of liquid crystal molecules tends to easily transition from the splay alignment to the bend alignment via a twisted alignment that is obtained by the zigzag shape. If the bend alignment is created at the end portions of the zigzag-shaped end portions of the pixel electrodes PE, the bend alignment spreads to the entirety of the pixel electrodes PE.

If AC voltages of the disturbing voltage VS1, disturbing voltage VS2 and transition voltage are used to drive the liquid crystal display element PX by the disturbing drive scheme, nuclei for transition will efficiently be generated. If the disturbance is caused, even if generation of nuclei for transition fails at first, nuclei for transition can be generated by a second or third waveform.

In FIG. 16, transition voltages, which are applied to mutually neighboring OCB liquid crystal display elements PX, have opposite characteristics. In the first-half transition period 6, the transition voltage setting unit 1 applies a first-polarity voltage 3B, which is a positive-polarity voltage, to a first OCB liquid crystal display element PX, and applies a second-polarity voltage 4B, which is a negative-polarity voltage, to a second OCB liquid crystal display element PX that neighbors the first OCB liquid crystal display element PX. The first-polarity voltage is a voltage obtained by adding the transition voltage, which is applied as the common voltage Vcom to the counter-electrode CE, and the disturbing voltage VS1, which is applied as the pixel voltage to the pixel electrode PE. The second-polarity voltage 4B is a voltage obtained by adding a transition voltage, which is an inverted voltage of the transition voltage that is applied as the common voltage Vcom to the counter-electrode CE, and the disturbing voltage VS2, which is applied as the pixel voltage to the pixel electrode PE. The number of inversions of each of the disturbing voltage VS1 and disturbing voltage VS2 in the first-half transition period 6 is an even number, that is, four.

In the second-half transition period 7, the transition voltage setting unit 1 applies a second-polarity voltage 4B, which is a negative-polarity voltage, to the first OCB liquid crystal display element PX, and applies a first-polarity voltage 3B, which is a positive-polarity voltage, to the second OCB liquid crystal display element PX.

As has been described above, if the OCB liquid crystal display elements PX are driven with the combination of the disturbing drive scheme, a higher reliability of transition is realized.

Figure 19:
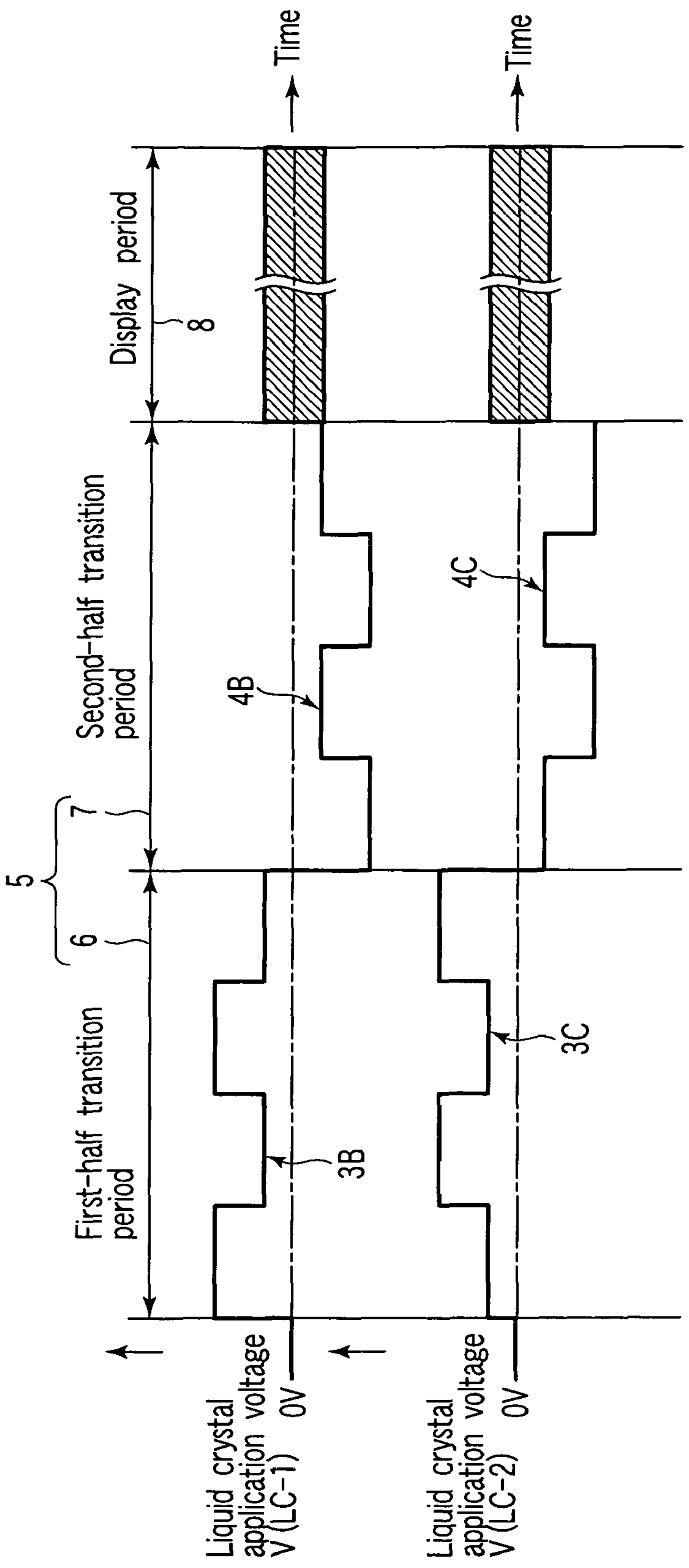
FIG. 19 is a waveform diagram illustrating an operation obtained by a twelfth modification of the driving circuit shown in FIG. 1.

FIG. 19 illustrates an operation obtained by a twelfth modification of the driving circuit DR. The structural elements in FIG. 19, which are common to those in FIG. 16, are denoted by the same reference symbols, and a detailed description thereof is omitted. In this modification, in the first-half transition period 6, the transition voltage setting unit 1 applies a first-polarity voltage 3B, which is a positive-polarity voltage, to a first OCB liquid crystal display element PX. The first-polarity voltage 3B is a voltage obtained by adding a voltage, which is an inverted voltage of the transition voltage that is applied as the common voltage Vcom, and the disturbing voltage VS1. The first-polarity voltage 3B maintains a predetermined first positive voltage for a predetermined period, and then falls to a predetermined second positive voltage that is lower than the predetermined first positive voltage. After a predetermined period, the first-polarity voltage 3B rises once again to the predetermined first positive voltage. Further, after a predetermined period, the first-polarity voltage 3B falls to the predetermined second positive voltage.

In the first-half transition period 6, the transition voltage setting unit 1 applies a first-polarity voltage 3C, which is a positive-polarity voltage, to a second OCB liquid crystal display element PX that neighbors the first OCB liquid crystal display element PX. The first-polarity voltage 3C is a voltage obtained by adding a voltage, which is an inverted voltage of the transition voltage that is applied as the common voltage Vcom, and the disturbing voltage VS2. The first-polarity voltage 3C maintains a second positive voltage for a predetermined period, and then rises to a first positive voltage. After a predetermined period, the first-polarity voltage 3C falls once again to the second positive voltage. Further, after a predetermined period, the first-polarity voltage 3C rises to the first positive voltage.

In the second-half transition period 7, the transition voltage setting unit 1 applies a second-polarity voltage 4B, which is a negative-polarity voltage, to the first OCB liquid crystal display element PX. The second-polarity voltage 4B is a voltage obtained by adding a voltage, which is an inverted voltage of the transition voltage that is applied as the common voltage Vcom, and the disturbing voltage VS2. The second-polarity voltage 4B maintains a first negative voltage for a predetermined period, and then rises to a second negative voltage that is higher than the first negative voltage. After a predetermined period, the second-polarity voltage 4B falls once again to the first negative voltage. Further, after a predetermined period, the second-polarity voltage 4B rises to the second negative voltage.

In the second-half transition period 7, the transition voltage setting unit 1 applies a second-polarity voltage 4C, which is a negative-polarity voltage, to the second OCB liquid crystal display element PX that neighbors the first OCB liquid crystal display element PX. The second-polarity voltage 4C is a voltage obtained by adding a voltage, which is an inverted voltage of the transition voltage that is applied as the common voltage Vcom, and the disturbing voltage VS1. The second-polarity voltage 4C maintains the second negative voltage for a predetermined period, and then falls to the first negative voltage. After a predetermined period, the second-polarity voltage 4C rises once again to the second negative voltage. Further, after a predetermined period, the second-polarity voltage 4C falls to the first negative voltage.

Figure 20:
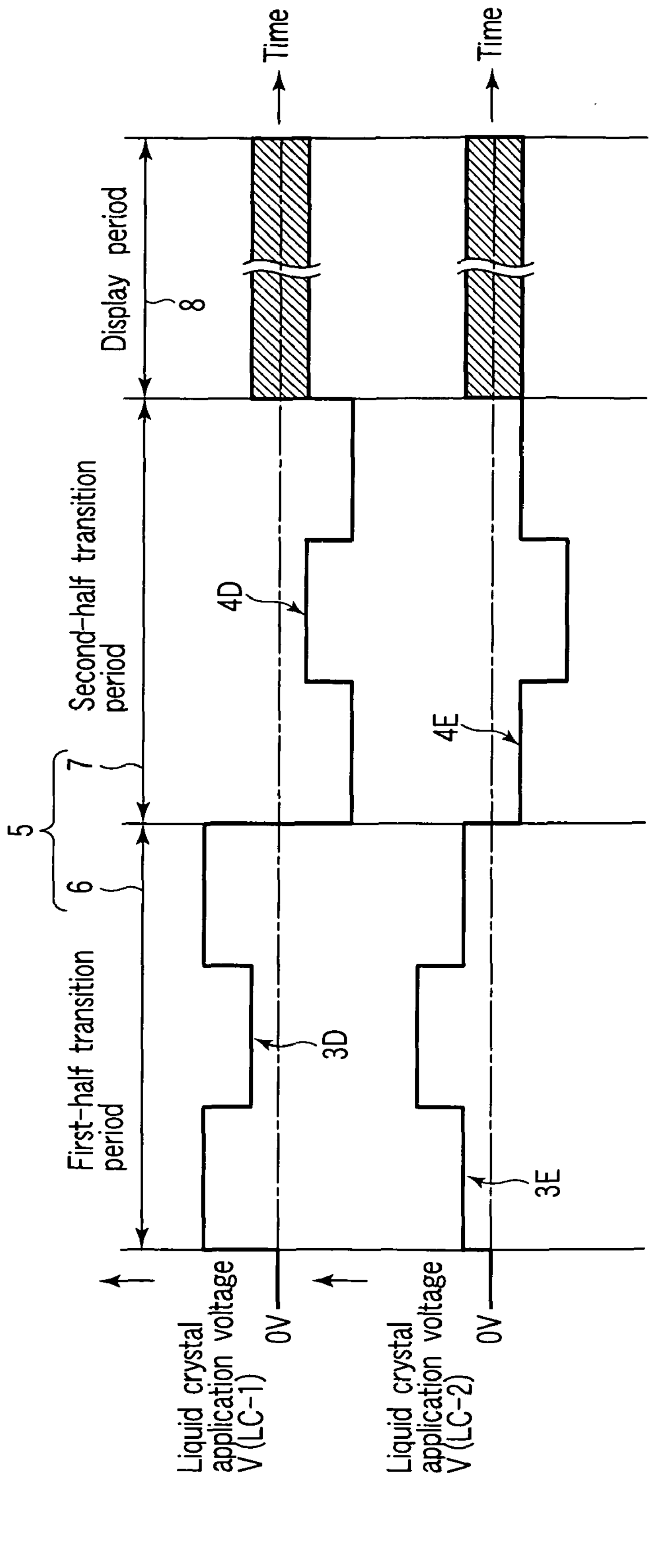
FIG. 20 is a waveform diagram illustrating an operation obtained by a 13th modification of the driving circuit shown in FIG. 1.

FIG. 20 illustrates an operation obtained by a 13th modification of the driving circuit DR. The structural elements in FIG. 20, which are common to those in FIG. 19, are denoted by the same reference symbols, and a detailed description thereof is omitted. In this modification, in the first-half transition period 6, the transition voltage setting unit 1 applies a first-polarity voltage 3D, which is a positive-polarity voltage, to a first OCB liquid crystal display element PX. The first-polarity voltage 3B is a voltage obtained by adding a voltage, which is an inverted voltage of the transition voltage that is applied as the common voltage Vcom, and the disturbing voltage VS1. The first-polarity voltage 3D maintains a first positive voltage for a predetermined period, and then falls to a second positive voltage that is lower than the first positive voltage. After a predetermined period, the first-polarity voltage 3D rises once again to the first positive voltage. In the example shown in FIG. 20, the number of inversions of the disturbing voltage VS1, which is included in the first-polarity voltage 3D, is an odd number, that is, three.

In the first-half transition period 6, the transition voltage setting unit 1 applies a first-polarity voltage 3E, which is a positive-polarity voltage, to a second OCB liquid crystal display element PX that neighbors the first OCB liquid crystal display element PX. The first-polarity voltage 3E is a voltage obtained by adding a voltage, which is an inverted voltage of the transition voltage that is applied as the common voltage Vcom, and the disturbing voltage VS2. The first-polarity voltage 3E maintains a second positive voltage for a predetermined period, and then rises to a first positive voltage. After a predetermined period, the first-polarity voltage 3E falls once again to the second positive voltage. In the example shown in FIG. 20, the number of inversions of the disturbing voltage VS2, which is included in the first-polarity voltage 3E, is an odd number, that is, three.

In the second-half transition period 7, the transition voltage setting unit 1 applies a second-polarity voltage 4D, which is a negative-polarity voltage, to the first OCB liquid crystal display element PX. The second-polarity voltage 4D maintains a first negative voltage for a predetermined period, and then rises to a second negative voltage that is higher than the first negative voltage. After a predetermined period, the second-polarity voltage 4D falls once again to the first negative voltage. The initial characteristics of the disturbing voltage VS2, which is included in the second-polarity voltage 4D in the second-half transition period 7, are negative characteristics and are opposite to the positive initial characteristics of the disturbing voltage VS1, which is included in the first-polarity voltage 3D in the first-half transition period 6.

In the second-half transition period 7, the transition voltage setting unit 1 applies a second-polarity voltage 4E, which is a negative-polarity voltage, to the second OCB liquid crystal display element PX that neighbors the first OCB liquid crystal display element PX. The second-polarity voltage 4E maintains the second negative voltage for a predetermined period, and then falls to the first negative voltage. After a predetermined period, the second-polarity voltage 4E rises once again to the second negative voltage. The initial characteristics of the disturbing voltage VS1, which is included in the second-polarity voltage 4E in the second-half transition period 7, are positive characteristics and are opposite to the negative initial characteristics of the disturbing voltage VS2, which is included in the first-polarity voltage 3E in the first-half transition period 6.

Second Embodiment

A liquid crystal display device according to a second embodiment of the present invention will now be described.

Figure 21:
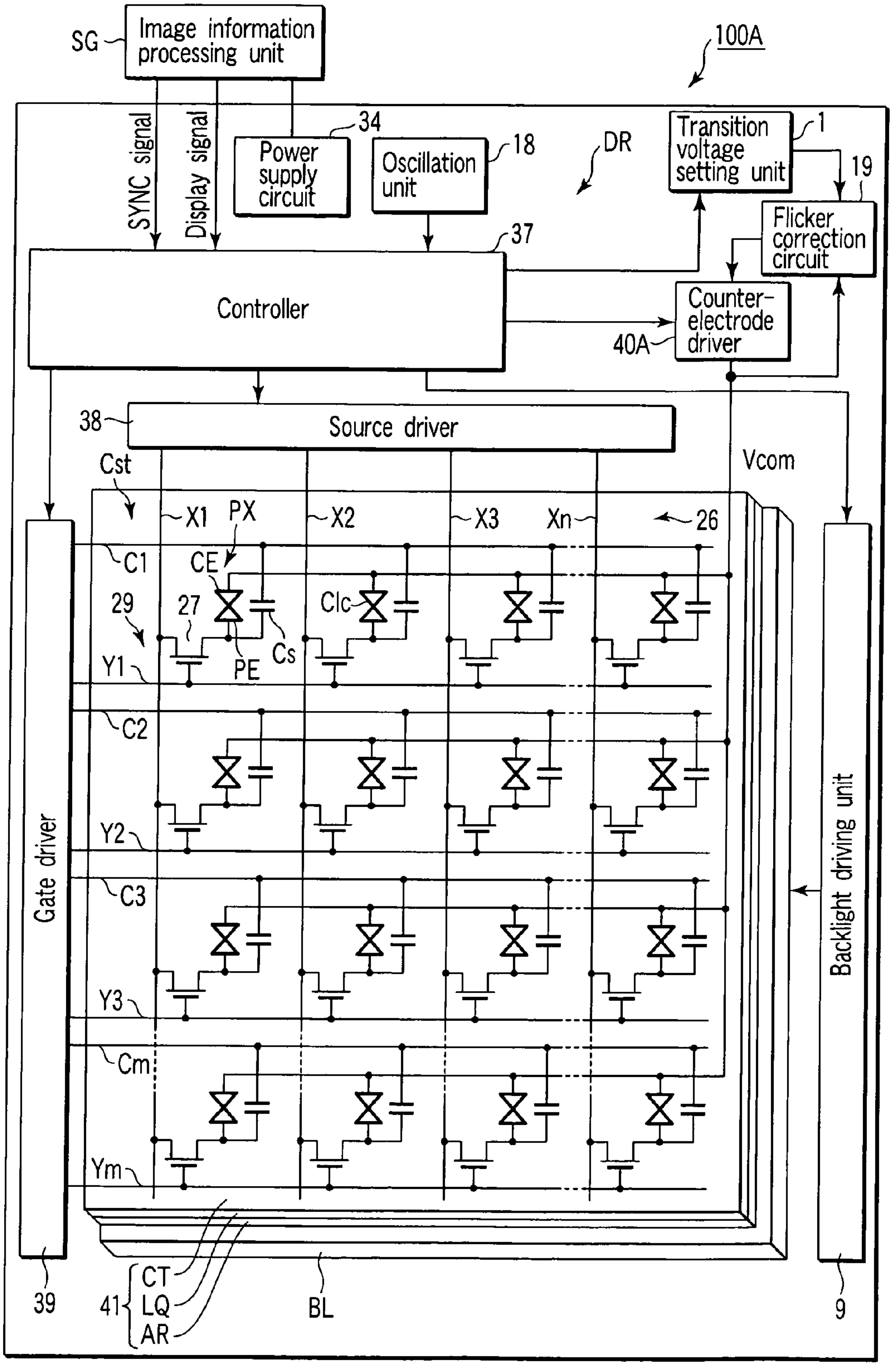
FIG. 21 is a block diagram showing the configuration of a liquid crystal display device according to a second embodiment of the present invention.

FIG. 21 shows the configuration of this liquid crystal display device 100A. In FIG. 21, the structural parts common to those in FIG. 1 are denoted by the same reference symbols, and a detailed description is omitted. The liquid crystal display device 100A differs from the device of the first embodiment in that the liquid crystal display device 100A further includes a flicker correction circuit 19, and the counter-electrode driver 40 is replaced with a counter-electrode driver 40A. The flicker correction circuit 19 applies a flicker correction voltage to each OCB liquid crystal display element PX via the counter-electrode driver 40A. This flicker correction voltage is used to correct flicker in an image displayed by the matrix array of OCB liquid crystal display elements PX.

Figure 22:
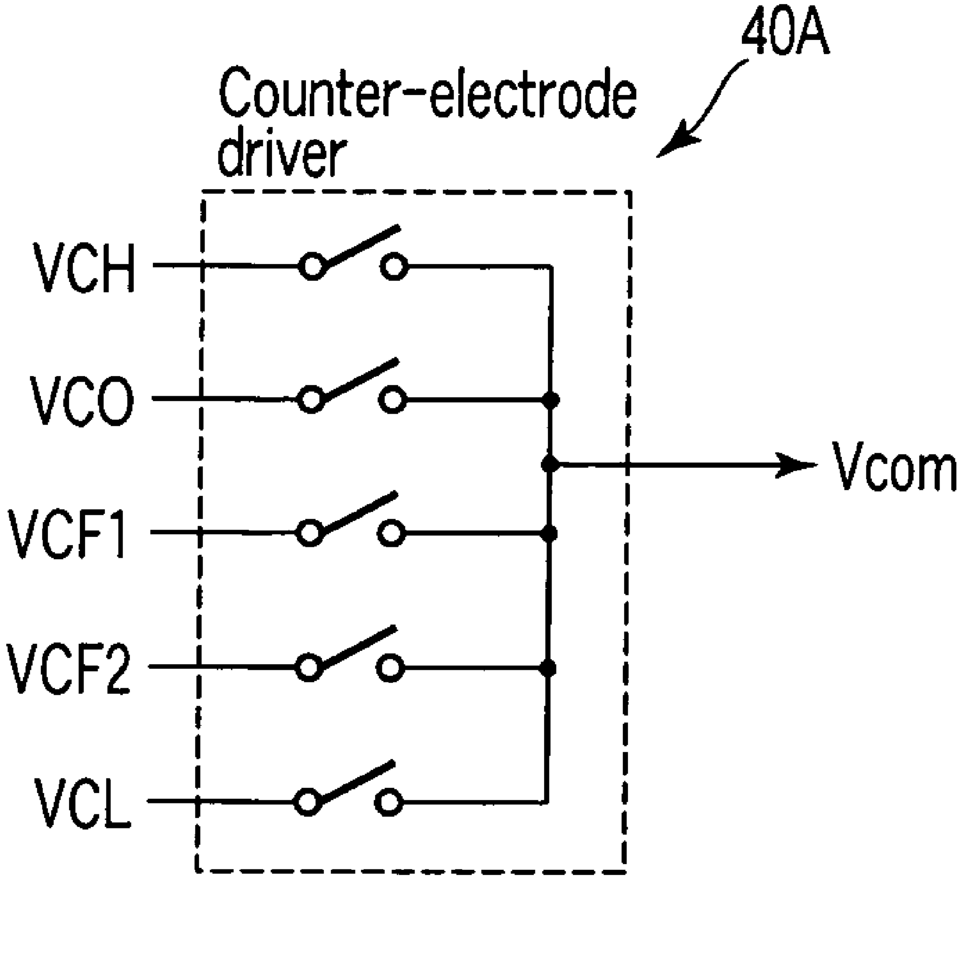
FIG. 22 is a circuit diagram showing the configuration of a counter-electrode driver provided in the liquid crystal display device shown in FIG. 21.
Figure 23:
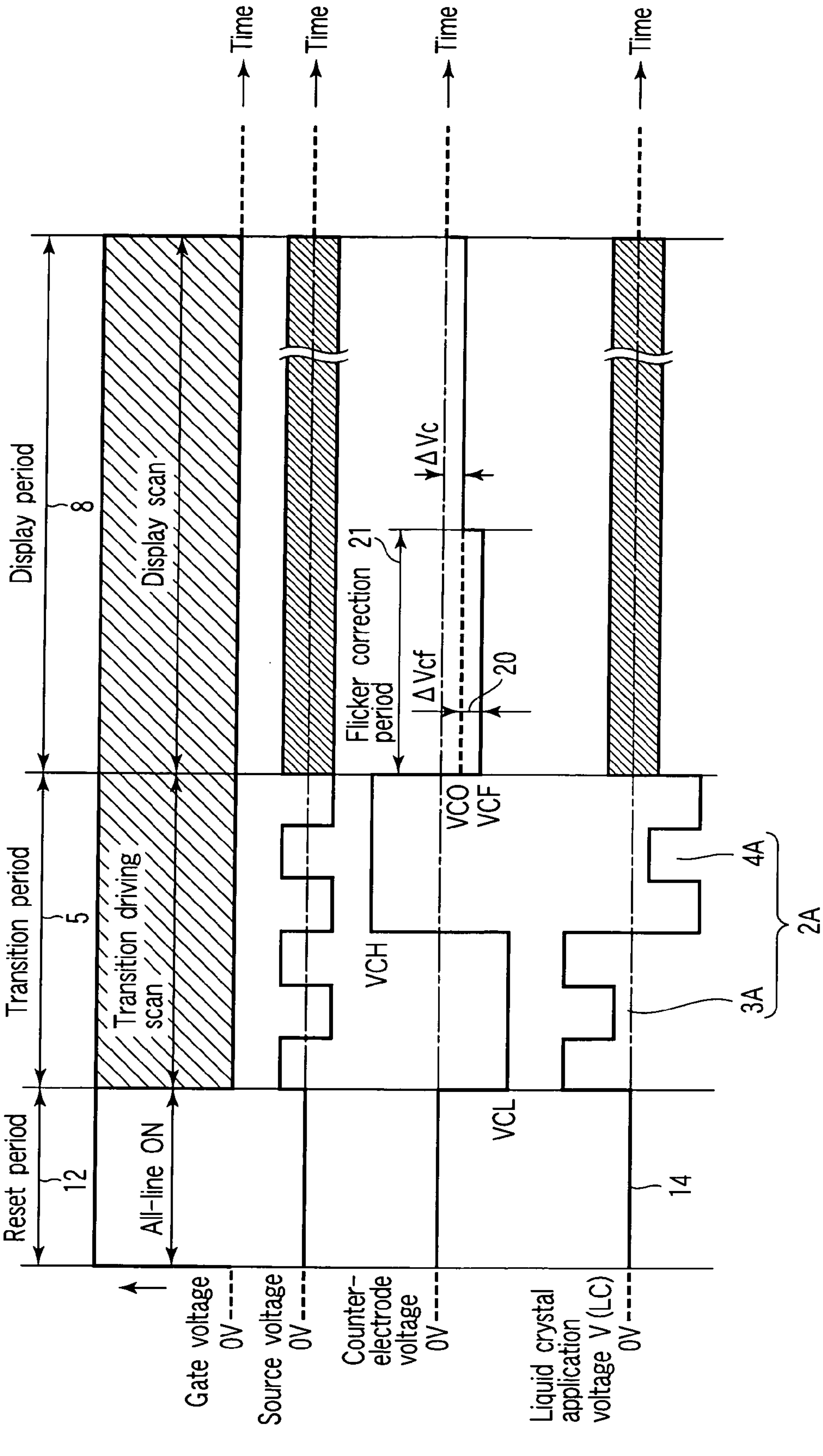
FIG. 23 is a waveform diagram for explaining an operation of the liquid crystal display device shown in FIG. 21.

FIG. 22 shows the configuration of the counter-electrode driver 40A, and FIG. 23 illustrates an operation of the liquid crystal display device 100A. In a reset period 12, the transition voltage setting unit 1 applies a reset voltage 14, which has a potential VCF1 or a potential VCF2, to the counter-electrode CE via the counter-electrode driver 40A. In a first-half transition period of the transition period 5, the transition voltage setting unit 1 applies a voltage, which has a negative potential VCL, to the counter-electrode CE via the counter-electrode driver 40A. In a second-half transition period of the transition period 5, the transition voltage setting unit 1 applies a voltage, which has a positive potential VCH, to the counter-electrode CE via the counter-electrode driver 40A.

In the transition period 5, the controller 37 applies a rectangular voltage to the OCB liquid crystal display elements PX via the source driver 38. As a result, a first-polarity voltage 3A that is a positive-polarity voltage is applied to the OCB liquid crystal display elements PX in the first-half transition period of the transition period 5, and a second-polarity voltage 4A that is a negative-polarity voltage is applied to the OCB liquid crystal display elements PX in the second-half transition period of the transition period 5. In a flicker correction period 21 that is provided at the beginning of the display period 8, a flicker correction voltage ΔVcf is applied from the counter-electrode driver 40A to the counter-electrode CE.

Since the flicker correction voltage 20 is applied to the counter-electrode CE, the voltage at the counter-electrode CE can temporally be varied. Thus, flicker in an image, which is displayed by the matrix array of the OCB liquid crystal display elements PX, can be canceled.

Figure 24:
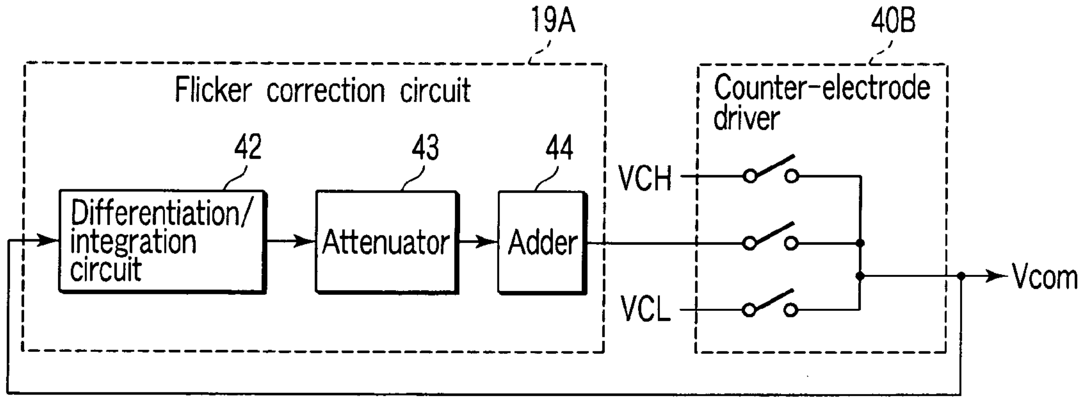
FIG. 24 is a circuit diagram showing the configurations of another flicker correction circuit and another counter-electrode driver, which are provided in a first modification of the driving circuit shown in FIG. 21.
Figure 25:
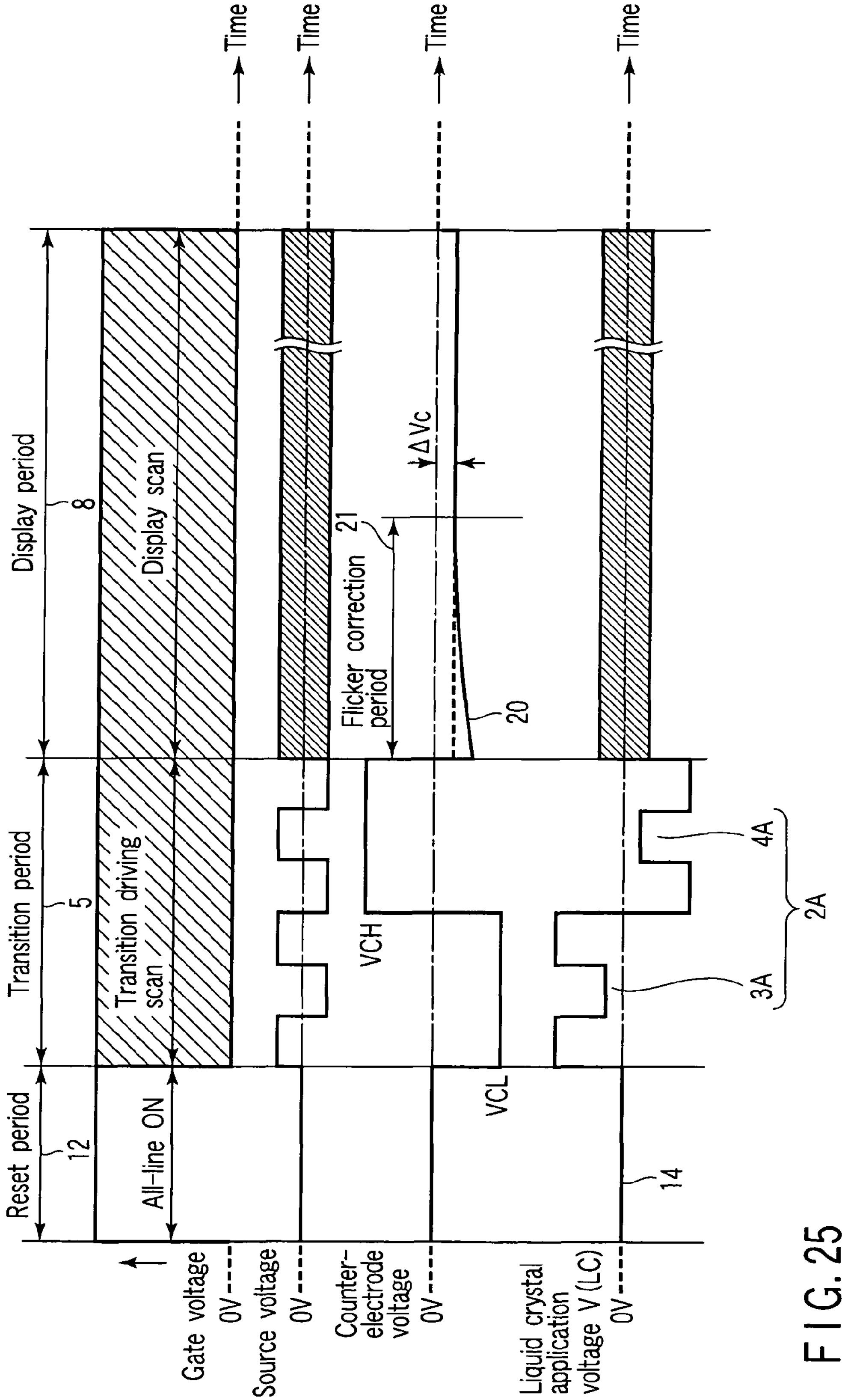
FIG. 25 is a waveform diagram illustrating an operation obtained by the first modification of the driving circuit shown in FIG. 21.

FIG. 24 shows the configurations of another flicker correction circuit 19A and another counter-electrode driver 40B, which are provided in a first modification of the driving circuit DR, and FIG. 25 illustrates an operation obtained by the first modification of the driving circuit DR. In FIG. 25, the same structural components as those in FIG. 23 are denoted by the same reference symbols, and a detailed description is omitted.

The flicker correction circuit 19A includes a differentiation/integration circuit 42, an attenuator 43 and an adder 44. The attenuator 43 receives an output from the differentiation/integration circuit 42, and delivers it to the adder 44. The adder 44 adds a Vcom reference voltage and an output from the attenuator 43, and delivers the added result to the counter-electrode driver 40B. The counter-electrode driver 40B outputs a flicker correction voltage, on the basis of the output from the adder 44, the voltage VCH and the voltage VCL, to the counter-electrode CE and the differentiation/integration circuit 42 provided in the flicker correction circuit 19A. As described above, the flicker correction circuit 19A and counter-electrode driver 40B constitute the mechanism for feedback-controlling the flicker correction voltage.

In the flicker correction period 21 that is provided at the beginning of the display period 8, a flicker correction voltage 20 is applied to the counter-electrode CE. The flicker correction voltage 20 has a negative polarity, and the absolute value thereof monotonously decreases to the value of voltage ΔVc.

By applying the flicker correction voltage in this manner, it becomes possible to prevent DC application to the liquid crystal display elements PX. As a result, flicker and burn-in can be reduced. Moreover, since the DC application to the liquid crystal display elements PX is prevented, the initialization in the transition can reliably be achieved.

Third Embodiment

A liquid crystal display device according to a third embodiment of the present invention will now be described.

Figure 26:
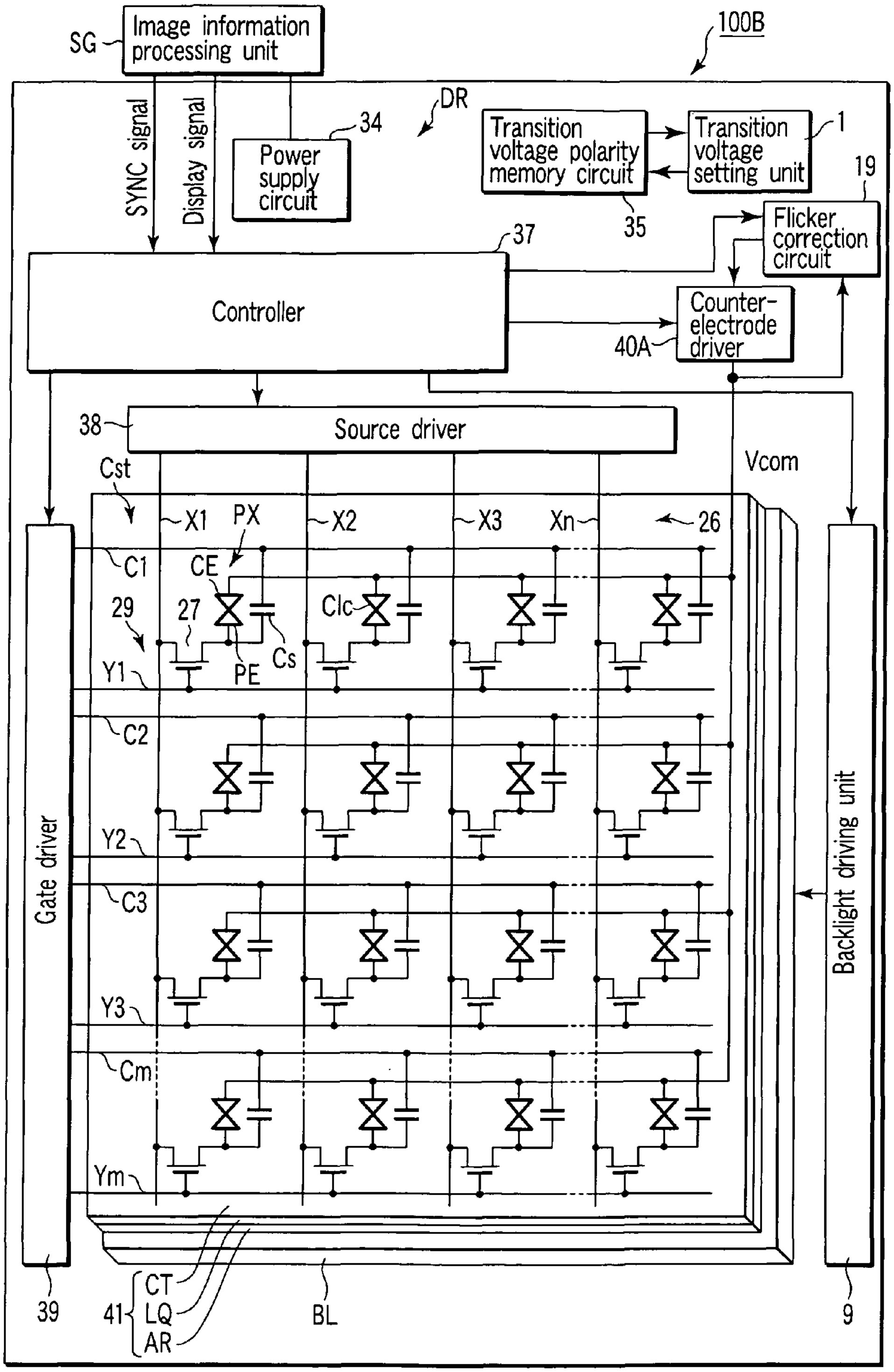
FIG. 26 is a block diagram showing the configuration of a liquid crystal display device according to a third embodiment of the present invention.

FIG. 26 shows the configuration of this liquid crystal display device 100B. In FIG. 26, the structural parts common to those in FIG. 21 are denoted by the same reference symbols, and a detailed description is omitted. The liquid crystal display device 100B differs from the device of the second embodiment in that the liquid crystal display device 100B includes a transition voltage polarity memory circuit 35 in place of the oscillation unit 18. The transition voltage polarity memory circuit 35 comprises a nonvolatile memory and stores the polarity of the transition voltage that is applied to the OCB liquid crystal display elements PX.

Figure 27:
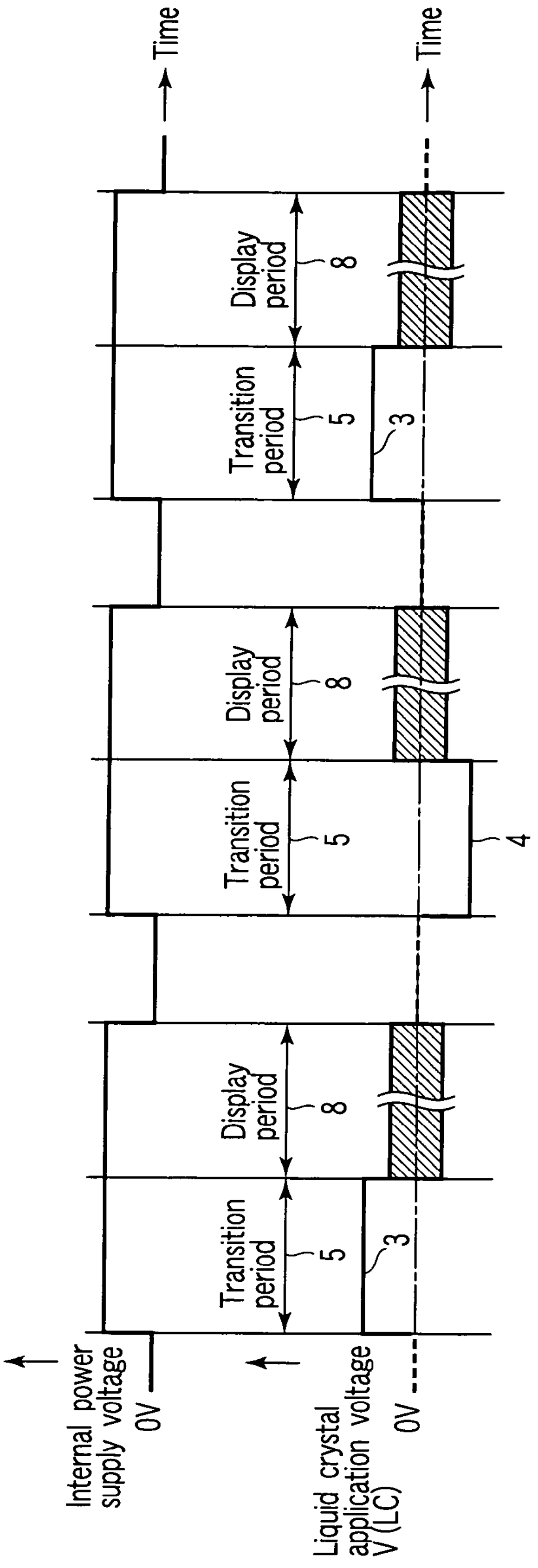
FIG. 27 is a waveform diagram for explaining an operation of the liquid crystal display device shown in FIG. 26.

FIG. 27 illustrates an operation of the liquid crystal display device 100B. In FIG. 27, the structural parts common to those in FIG. 5 are denoted by the same reference symbols, and a detailed description thereof is omitted.

If the power supply circuit 34 is turned on, the transition voltage setting unit 1 applies a first-polarity voltage 3, which is a positive-polarity voltage, to each OCB liquid crystal display element PX during the transition period 5. In the display period 8 that follows the transition period 5, the controller 37 controls the source driver 38, gate driver 39 and counter-electrode driver 40 so as to cause the matrix array of OCB liquid crystal display element PX to display an image corresponding to the display signal that is in sync with the sync signal.

Subsequently, the power supply circuit 34 is turned off. After a predetermined time period, the power supply circuit 34 is turned on once again, and the transition voltage setting unit 1 applies a second-polarity voltage 4, which is a negative-polarity voltage, to each OCB liquid crystal display element PX during the transition period 5. In the display period 8 that follows the transition period 5, the controller 37 controls the source driver 38, gate driver 39 and counter-electrode driver 40 so as to cause the matrix array of OCB liquid crystal display element PX to display an image corresponding to the display signal that is in sync with the sync signal.

Then, the power supply circuit 34 is turned off again. After a predetermined time period, the power supply circuit 34 is turned on, and the transition voltage setting unit 1 applies the first-polarity voltage 3, which is a positive-polarity voltage, to each OCB liquid crystal display element PX during the transition period 5. In the display period 8 that follows the transition period 5, the controller 37 controls the source driver 38, gate driver 39 and counter-electrode driver 40 so as to cause the matrix array of OCB liquid crystal display element PX to display an image corresponding to the display signal that is in sync with the sync signal.

As has been described above, in the transition period 5 and the subsequent transition period 5, the transition voltage setting unit 1 applies the first-polarity voltage 3 and second-polarity voltage 4, respectively. Thereby, the matrix array of OCB liquid crystal display elements PX displays an image in the display period 8 between the two transition periods 5 and in the display period 8 that follows the second transition period 5.

Thus, the transition voltage is applied in AC fashion when the alignment state of liquid crystal molecules is transitioned from the splay alignment to the bend alignment. Accordingly, even in the case where the power supply circuit 34 of the device is repeatedly turned on and off, it is possible to prevent DC voltage from being applied to the OCB liquid crystal display elements PX at the time of transition. As a result, it is possible to reduce flicker in an image that is displayed by the matrix array of OCB liquid crystal display elements PX.

Figure 28:
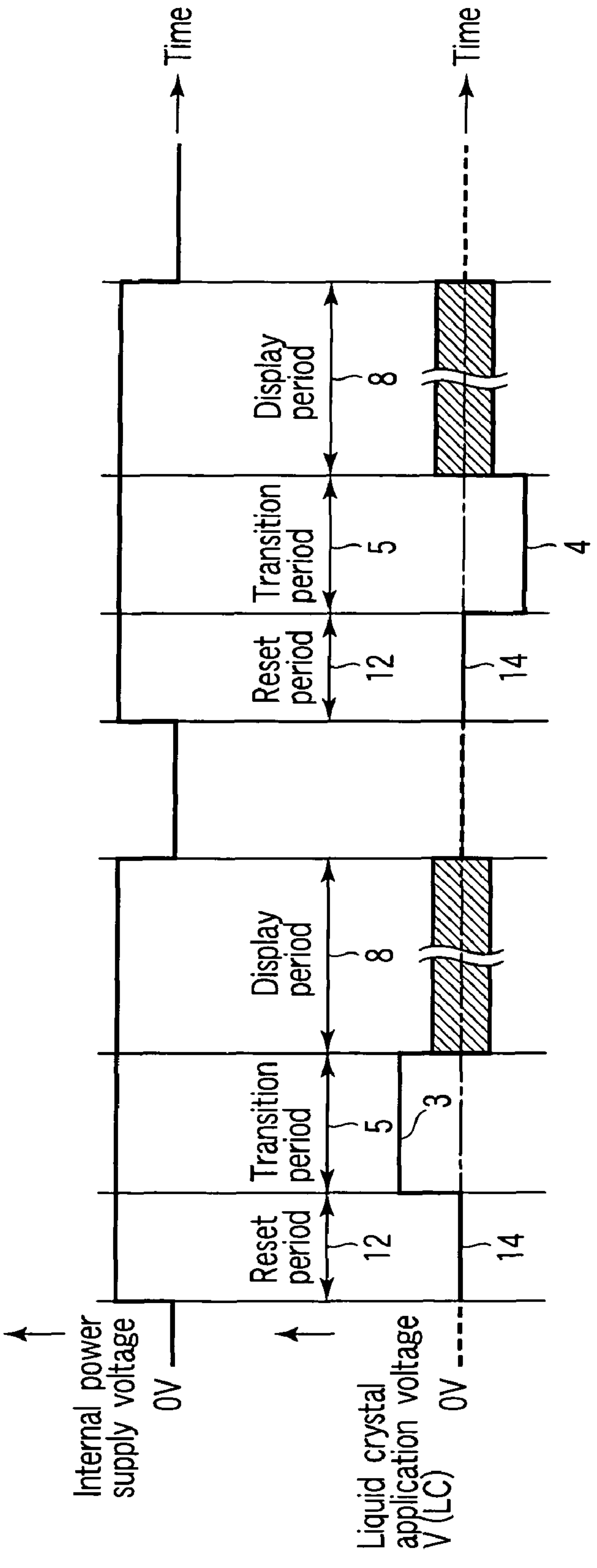
FIG. 28 is a waveform diagram illustrating an operation obtained by a first modification of the driving circuit shown in FIG. 26.

FIG. 28 illustrates an operation obtained by a first modification of the driving circuit DR. In FIG. 28, the structural elements, which are common to those in FIG. 1 and FIG. 27, are denoted by the same reference symbols, and a detailed description thereof is omitted. As is shown in FIG. 28, a reset period 12 may be provided before each transition period 5, and a reset voltage 14 may be applied in the reset period 12.

Figure 29:
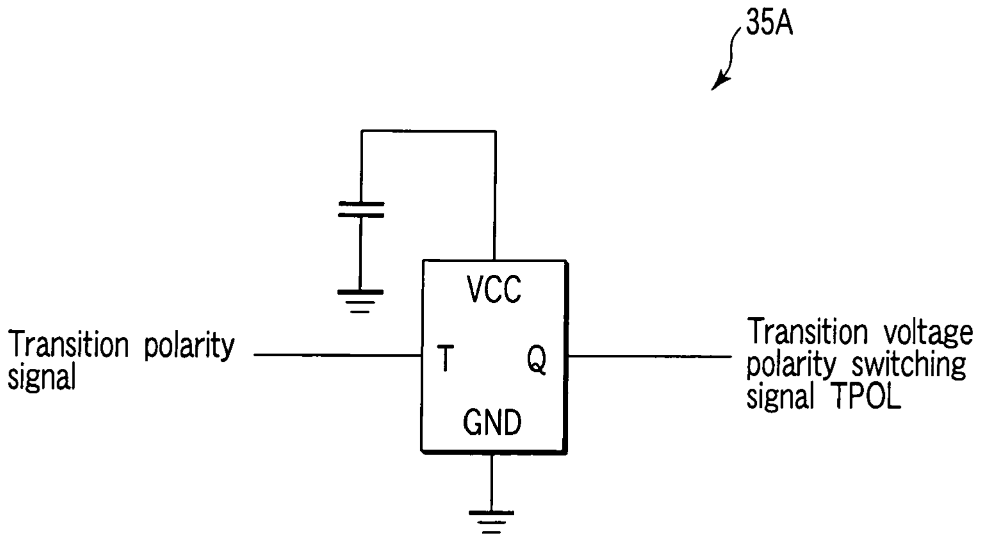
FIG. 29 is a circuit diagram showing the configuration of another transition voltage polarity memory circuit, which is provided in a second modification of the driving circuit shown in FIG. 26.
Figure 30:
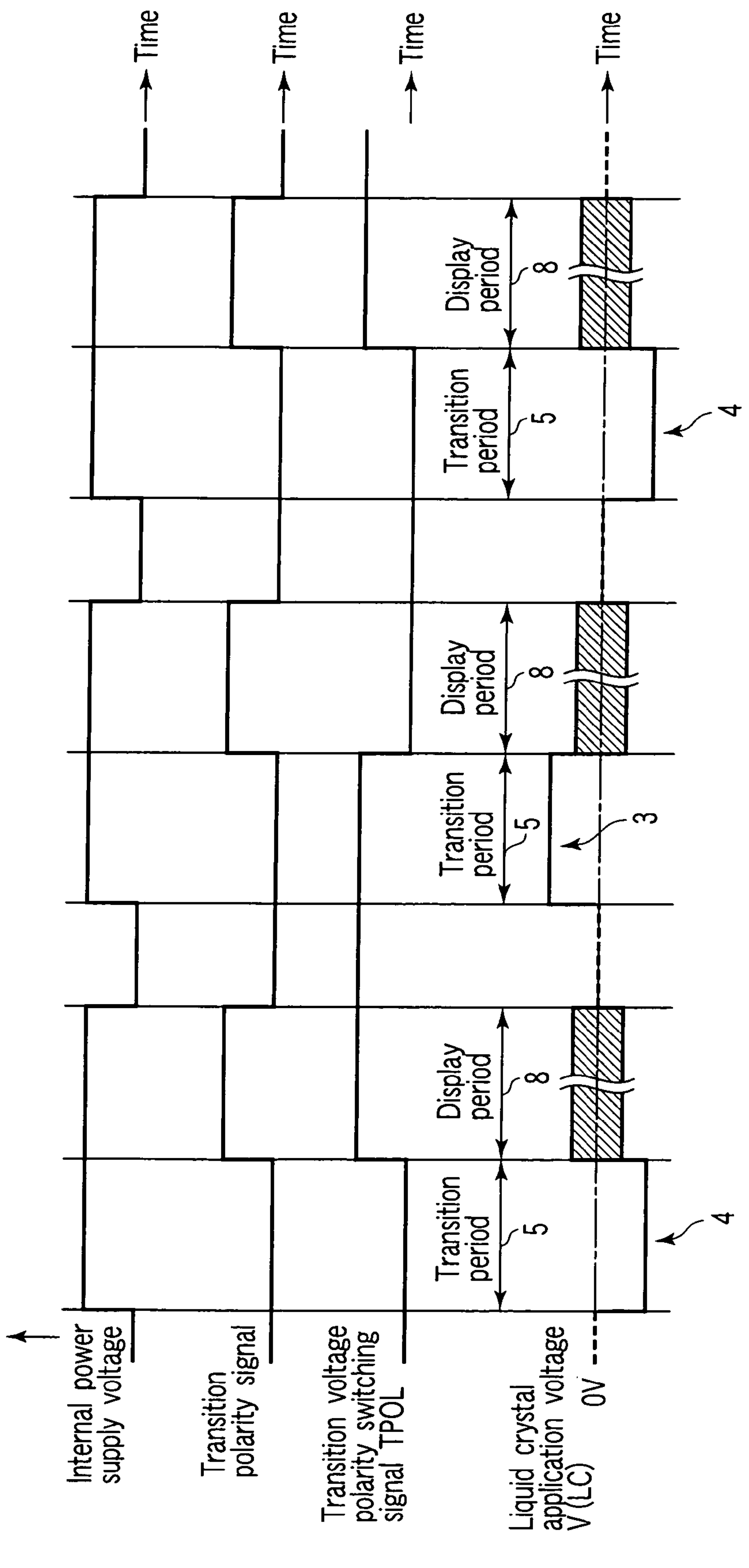
FIG. 30 is a waveform diagram showing an operation obtained by the second modification of the driving circuit shown in FIG. 26.

FIG. 29 shows the configuration of another transition voltage polarity memory circuit 35A, which is provided in a second modification of the driving circuit DR. FIG. 30 illustrates an operation obtained by the second modification of the driving circuit DR. The transition voltage polarity memory circuit 35A comprises a nonvolatile memory and a large-capacitance capacitor, and outputs a transition voltage polarity switching signal TPOL on the basis of a transition polarity signal.

If the power supply circuit 34 is turned on, the transition voltage setting unit 1 applies, during the transition period 5, a second-polarity voltage 4 that is a negative-polarity voltage to the OCB liquid crystal cell 22 in order to transition the alignment state of liquid crystal molecules from the splay alignment to the bend alignment. The transition polarity signal and transition voltage polarity switching signal TPOL are both at a low level.

At the beginning of the display period 8, the transition polarity signal and transition voltage polarity switching signal TPOL rise from the low level to a high level. In the display period 8 that follows the transition period 5, the controller 37 controls the source driver 38, gate driver 39 and counter-electrode driver 40 so as to cause the matrix array of OCB liquid crystal display element PX to display an image corresponding to the display signal that is in sync with the sync signal.

Subsequently, if the power supply circuit 34 is turned off, the transition polarity signal falls from the high level to the low level. The transition voltage polarity switching signal TPOL remains at the high level. After a predetermined time period, the power supply circuit 34 is turned on once again, and the transition voltage setting unit 1 applies, during the transition period 5, a first-polarity voltage 3 that is a positive-polarity voltage to the OCB liquid crystal display elements PX on the basis of the transition voltage polarity switching signal TPOL that remains at the high level.

At the beginning of the display period 8, the transition polarity signal rises from the low level to the high level. The transition voltage polarity switching signal TPOL falls from the high level to the low level in coincidence with the rising of the transition polarity signal from the low level to the high level. In the display period 8 that follows the transition period 5, the controller 37 controls the source driver 38, gate driver 39 and counter-electrode driver 40 so as to cause the matrix array of OCB liquid crystal display element PX to display an image corresponding to the display signal that is in sync with the sync signal.

Subsequently, if the power supply circuit 34 is turned off again, the transition polarity signal falls from the high level to the low level. The transition voltage polarity switching signal TPOL remains at the low level. After a predetermined time period, the power supply circuit 34 is turned on once again, and the transition voltage setting unit 1 applies, during the transition period 5, the second-polarity voltage 4 that is a negative-polarity voltage to the OCB liquid crystal display elements PX on the basis of the transition voltage polarity switching signal TPOL that remains at the low level.

At the beginning of the display period 8, the transition polarity signal rises from the low level to the high level. The transition voltage polarity switching signal TPOL rises from the low level to the high level in coincidence with the rising of the transition polarity signal from the low level to the high level. In the display period 8 that follows the transition period 5, the controller 37 controls the source driver 38, gate driver 39 and counter-electrode driver 40 so as to cause the matrix array of OCB liquid crystal display element PX to display an image corresponding to the display signal that is in sync with the sync signal.

As has been described above, the polarity of the transition voltage, which is applied to the OCB liquid crystal display elements PX, can be altered in accordance with the turn-on and turn-off of power, on the basis of the transition voltage polarity switching signal TPOL output from the transition voltage polarity memory circuit 35A.

A nonvolatile memory may be substituted for the transition voltage polarity memory circuit 35A.

During the image display period after the alignment state of liquid crystal molecules has transitioned from the splay alignment to the bend alignment, the matrix array of OCB liquid crystal display elements PX may be driven by a driving method such as a line-reversal drive scheme or a frame-reversal drive scheme, as well as the dot-reversal drive scheme. The driving method is not limited.

Figure 31:
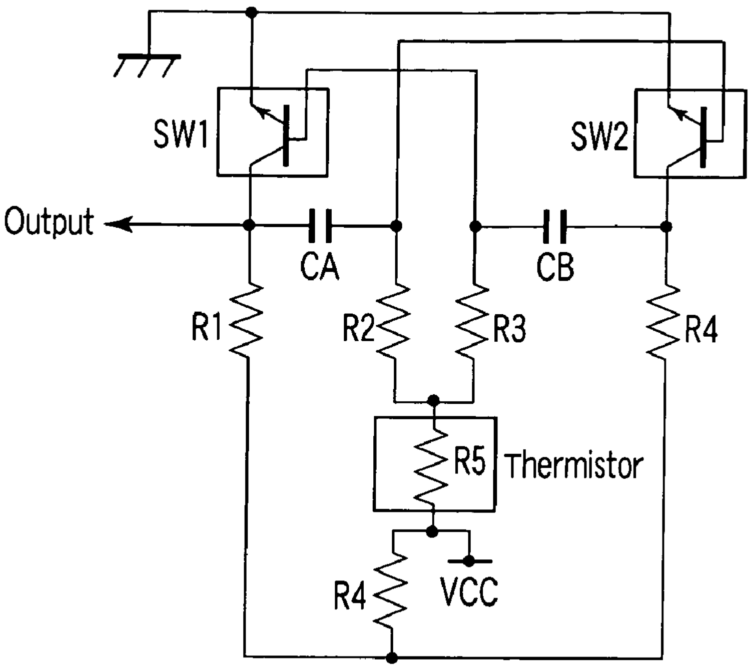
FIG. 31 shows a circuit configuration of a multivibrator that serves as an oscillation unit and a temperature detector shown in FIG. 1.

The oscillation unit 18 and temperature detector 36 shown in FIG. 1 may be integrally constructed as a multivibrator, for example, as shown in FIG. 31.

Figure 32:
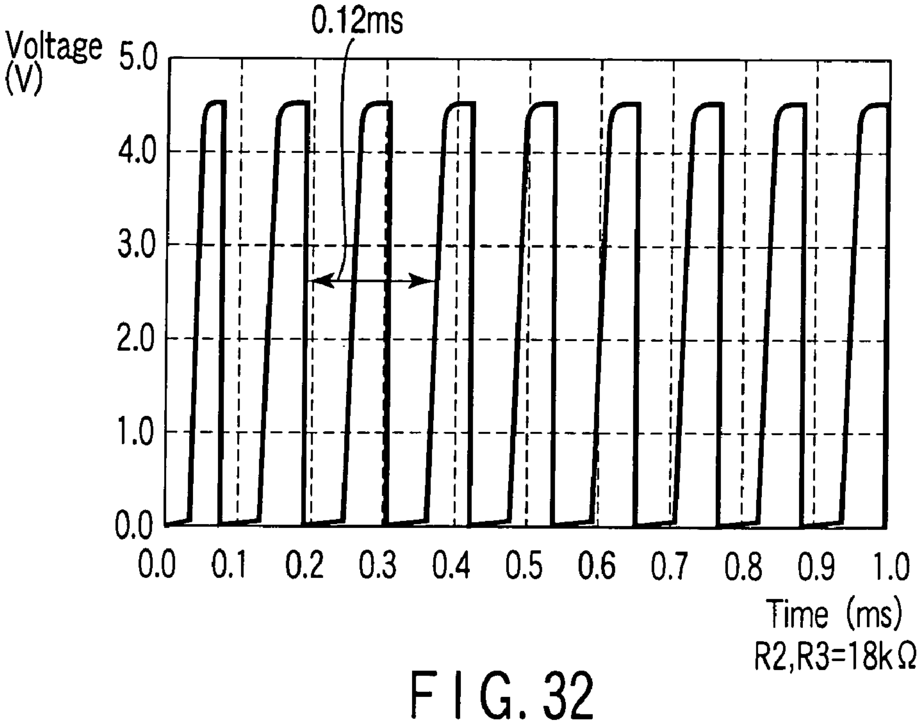
FIG. 32 shows an example of a clock signal output from the multivibrator shown in FIG. 31 in a case where resistor R2, R3=18 kΩ.
Figure 33:
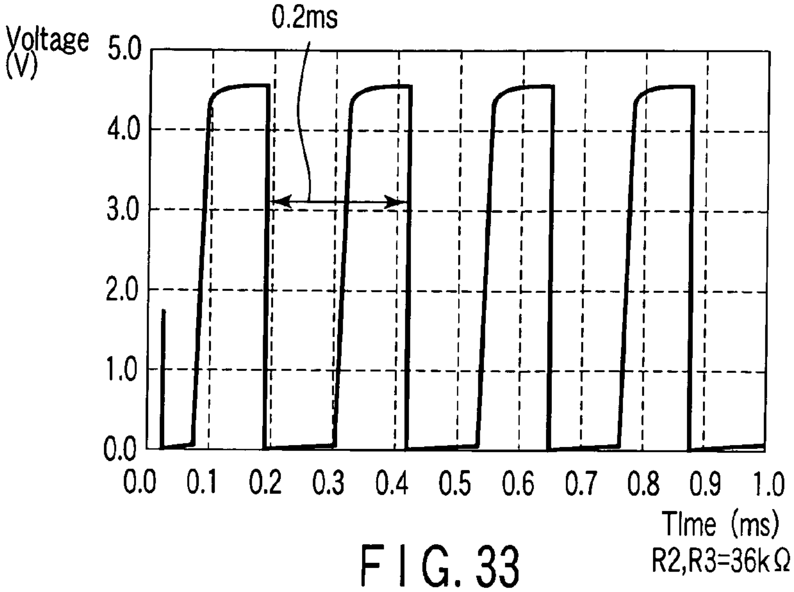
FIG. 33 shows an example of a clock signal that is output from the multivibrator shown in FIG. 31 in a case where resistor R2, R3=36 kΩ.
Figure 34:
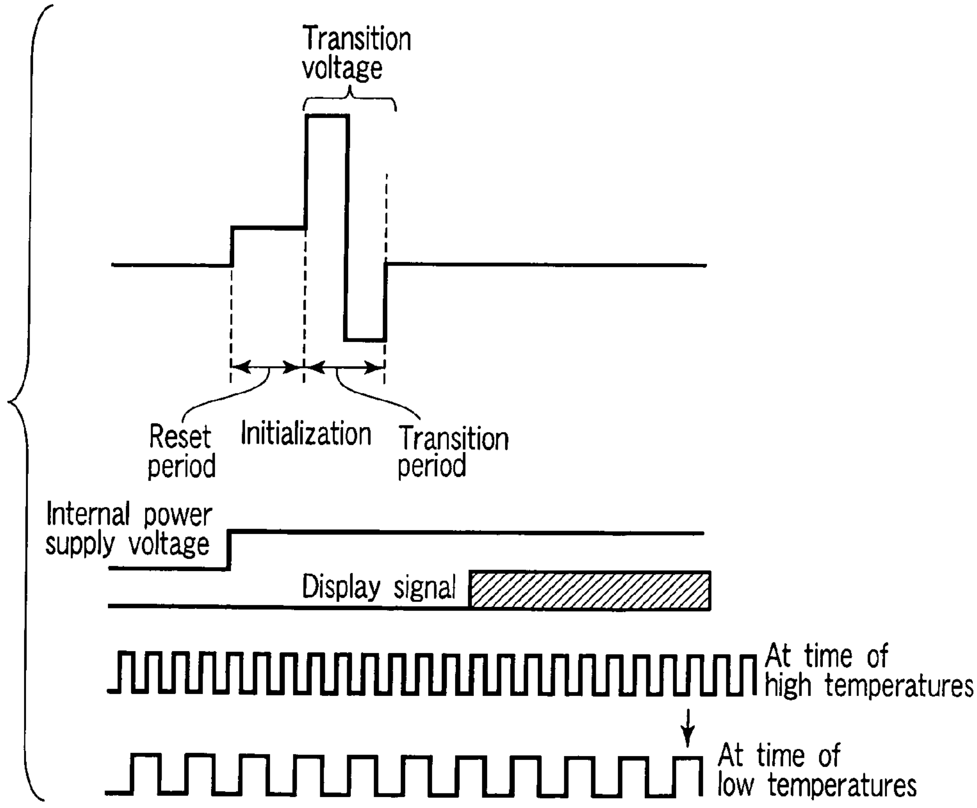
FIG. 34 shows a clock signal with a frequency varying in accordance with temperatures in the multivibrator shown in FIG. 31.
Figure 35:
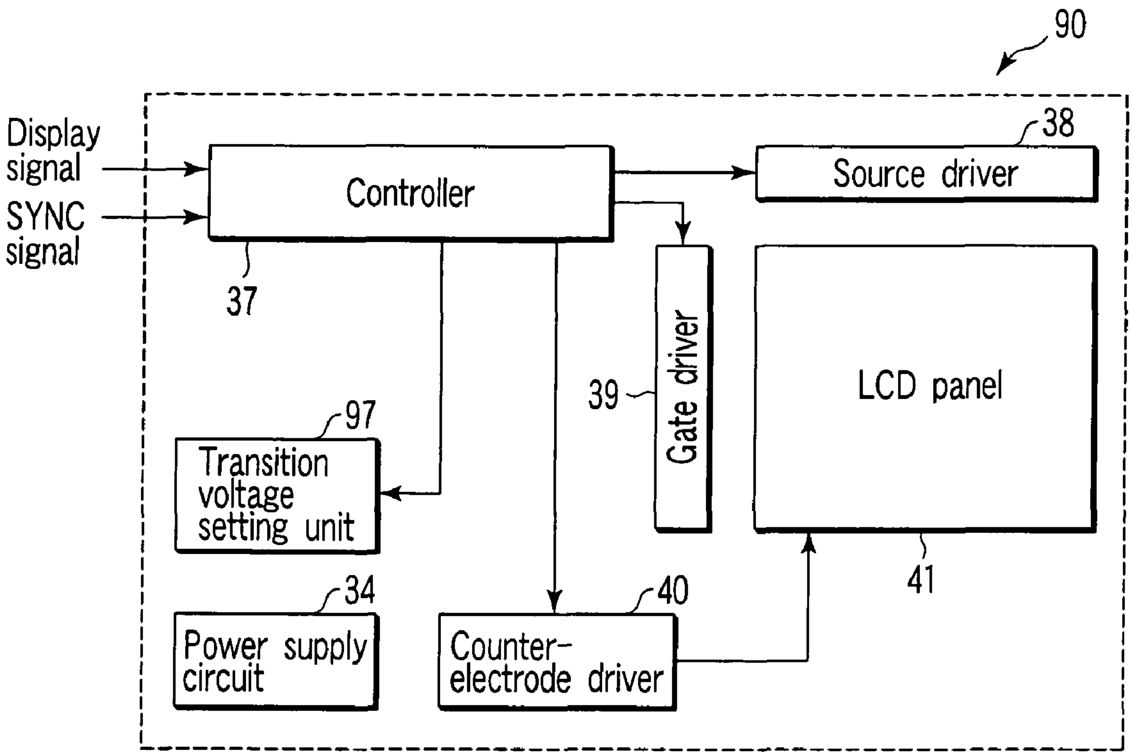
FIG. 35 (PRIOR ART)
FIG. 35 is a block diagram showing the configuration of a conventional liquid crystal display device.
Figure 36:
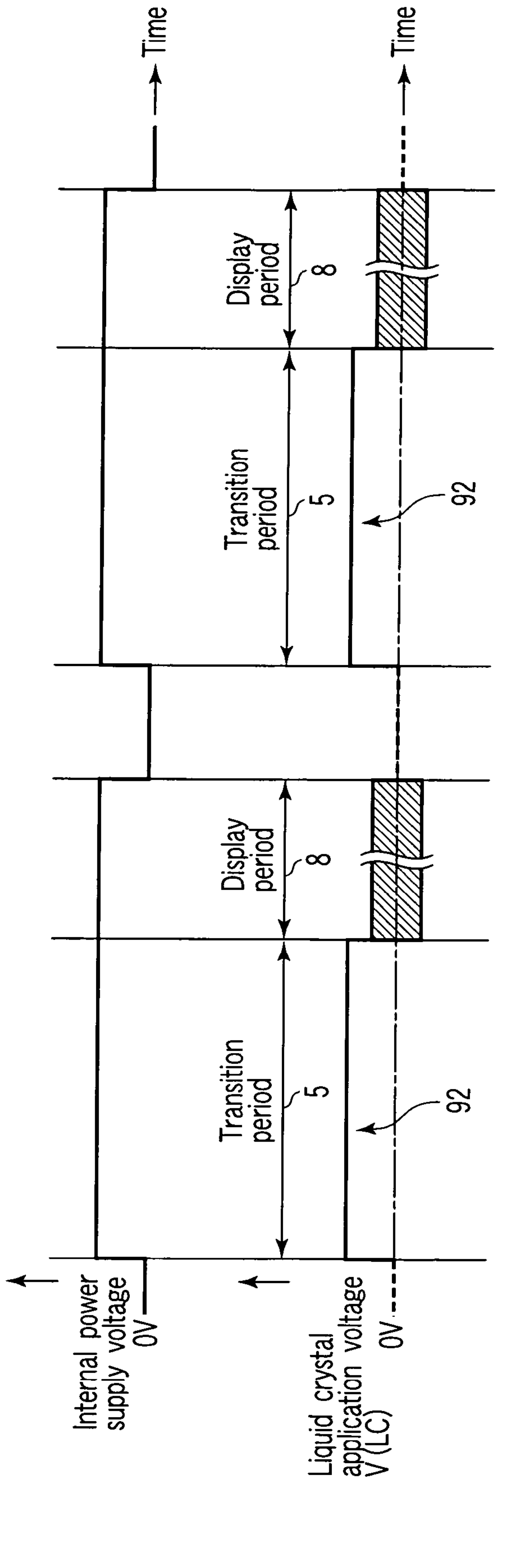
FIG. 36 (PRIOR ART)
FIG. 36 is a waveform diagram illustrating an operation of the liquid crystal display device shown in FIG. 35.

In this multivibrator, a resistor R5 is composed of an ordinary thermistor that functions as the temperature detector 36. In this case, the resistance value increases at a time of low temperatures and decreases at a time of high temperatures (for example, in the case of a B constant of 4485 K, a state with 10 kΩ at 25° C. changes to a state with 39 kΩ at 0° C. FIG. 32 shows an example of a clock signal that is output from the multivibrator in a case where a resistor R2, R3=18 kΩ, FIG. 33 shows an example of a clock signal that is output from the multivibrator in a case where the resistor R2, R3=36 kΩ, and FIG. 34 shows a clock signal with a frequency varying in accordance with temperatures in the multivibrator. The clock signal, as described above, serves as a reference for starting the application of the reset voltage and transition voltage, and for measuring the length of the reset period and the length of the transition period. For example, if the length of the transition period is the number of pulses of the clock signal=10000 counts, the transition period=1.2 s when the clock signal cycle is 0.12 ms at 25° C., and the transition period=2.4 s when the clock signal cycle is 0.24 ms at 0° C. Thus, since the frequency sequentially varies relative to the temperature, the transition period can sequentially be corrected on the basis of the temperature. As a result, a computer control on the controller 37 side is not needed, and the transition period can be controlled on the basis of only the ambient temperature, oscillation frequency and initial setting of the controller 37.

INDUSTRIAL APPLICABILITY

The present invention is applicable to a liquid crystal display device that displays an image by an OCB type liquid crystal.

What is claimed is:

1. A liquid crystal display device, comprising:

a liquid crystal display element section that is initialized such that the alignment state of liquid crystal molecules is transitioned from a splay alignment to a bend alignment capable of displaying an image, wherein said liquid crystal display element section includes a first electrode substrate in which a plurality of pixel electrodes are covered with an alignment film and arrayed in a matrix, a second electrode substrate in which a counter-electrode is covered with an alignment film and disposed to face said pixel electrodes, and a liquid crystal layer that is held between said first and second electrode substrates in contact with said alignment films, said liquid crystal display element section providing a plurality of liquid crystal display elements each serving as a pixel in a range of the associated pixel electrode; and a driving circuit that applies, in the initialization, a transition voltage for causing the alignment state of the liquid crystal molecules to be transitioned from the splay alignment to the bend alignment, to said liquid crystal display element section, wherein said transition voltage is applied to said counter-electrode such that a potential of said counter-electrode shifts relative to a potential of each of said pixel electrodes, said driving circuit includes a disturbing drive means for applying, in an application period of the transition voltage, an AC disturbing voltage which shifts a potential of the pixel electrode relative to a potential of the counter-electrode, to the pixel electrode, and a polarity change cycle of the disturbing voltage is shorter than a polarity change cycle of the transition voltage;

wherein said driving circuit includes a transition voltage setting means for setting, as the transition voltage, a reset voltage that uniformizes the alignment state of the liquid crystal molecules, and alternately applied voltages that are a first polarity voltage and a second polarity voltage having a polarity opposite to a polarity of the first polarity voltage, and the reset voltage is applied to said liquid crystal display element section for a predetermined initial period, prior to any application of the first polarity voltage and the second polarity voltage.

2. The liquid crystal display device according to claim 1, wherein said transition voltage setting means is configured to detect an ambient temperature of said liquid crystal display element section, and to vary at least one of an application period of the transition voltage and a voltage amplitude of the transition voltage in accordance with a detected temperature.

3. The liquid crystal display device according to claim 1, wherein said transition voltage setting means is configured to detect an ambient temperature of said liquid crystal display element section, and to vary at least one of a total application period of the transition voltage and the reset voltage and a voltage amplitude of the transition voltage in accordance with a detected temperature.

4. The liquid crystal display device according to claim 1, wherein said driving circuit includes oscillation means for generating a clock signal which starts application of the transition voltage upon supply of power to the driving circuit.

5. The liquid crystal display device according to claim 4, wherein said oscillation means comprises a multivibrator that includes a thermistor for detecting an ambient temperature of the liquid crystal display element section, and that varies an application period of at least the transition voltage.

* * * * *